United States Patent
Dabeer et al.

(10) Patent No.: US 9,929,835 B2
(45) Date of Patent: Mar. 27, 2018

(54) TECHNIQUES FOR SYNCHRONIZING AND DESYNCHRONIZING CONTENTION FOR ACCESS TO A PLURALITY OF CHANNELS

(71) Applicant: QUALCOMM Incorporated, San Diego, CA (US)

(72) Inventors: Onkar Jayant Dabeer, San Diego, CA (US); Siddhartha Mallik, San Diego, CA (US); Taesang Yoo, Riverside, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 70 days.

(21) Appl. No.: 15/172,682

(22) Filed: Jun. 3, 2016

(65) Prior Publication Data

US 2017/0012748 A1 Jan. 12, 2017

Related U.S. Application Data

(60) Provisional application No. 62/190,943, filed on Jul. 10, 2015.

(51) Int. Cl.
H04W 56/00 (2009.01)
H04W 72/12 (2009.01)
H04W 74/08 (2009.01)
H04L 5/00 (2006.01)

(52) U.S. Cl.
CPC ......... *H04L 5/0007* (2013.01); *H04W 56/001* (2013.01); *H04W 72/1215* (2013.01); *H04W 74/08* (2013.01); *H04W 74/0816* (2013.01)

(58) Field of Classification Search
CPC ........... H04W 56/001; H04W 72/1215; H04W 74/08; H04W 74/0816; H04L 5/0007
See application file for complete search history.

(56) References Cited

U.S. PATENT DOCUMENTS

| 2015/0098412 A1 | 4/2015 | Yerramalli et al. |
| 2015/0103782 A1 | 4/2015 | Xu et al. |
| 2016/0081010 A1 | 3/2016 | Seok |

FOREIGN PATENT DOCUMENTS

WO WO-2014178678 A1 11/2014

OTHER PUBLICATIONS

ISA/EP, International Search Report and Written Opinion of the International Searching Authority, Int'l Application No. PCT/US2016/035983, dated Sep. 12, 2016, European Patent Office, Rijswijk, NL, 13 pgs.

*Primary Examiner* — Ronald B Abelson
(74) *Attorney, Agent, or Firm* — Dalei Dong; Holland & Hart LLP

(57) ABSTRACT

Techniques are described for wireless communication. One method includes identifying a plurality of counters used to contend for access to a plurality of channels of an unlicensed radio frequency spectrum band. Each of the plurality of counters is associated with a respective channel of the plurality of channels of the unlicensed radio frequency spectrum band. The method also includes measuring at least one channel of the plurality of channels of the unlicensed radio frequency spectrum band. The measuring is associated with a contention for access to the at least one channel of the unlicensed radio frequency spectrum band. The method also includes synchronizing or desynchronizing at least a subset of the plurality of counters based at least in part on the measuring.

28 Claims, 17 Drawing Sheets

TECHNIQUES FOR SYNCHRONIZING AND DESYNCHRONIZING CONTENTION FOR ACCESS TO A PLURALITY OF CHANNELS

CROSS REFERENCES

The present Application for Patent claims priority to U.S. Provisional Patent Application No. 62/190,943 by Dabeer, et al., entitled "TECHNIQUES FOR SYNCHRONIZING AND DESYNCHRONIZING CONTENTION FOR ACCESS TO A PLURALITY OF CHANNELS," filed Jul. 10, 2015, assigned to the assignee hereof, which is hereby incorporated by reference in its entirety.

BACKGROUND

Field of the Disclosure

The present disclosure, for example, relates to wireless communication systems, and more particularly to synchronizing and desynchronizing contention for access to a plurality of channels of an unlicensed radio frequency spectrum band.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

In some wireless communication systems, base stations and UEs may communicate on an enhanced component carrier (eCC) in an unlicensed radio frequency spectrum band. Prior to gaining access to and communicating over an eCC, the base station or UE may contend for access to a plurality of channels of an unlicensed radio frequency spectrum band. Contending for access to each channel of the unlicensed radio frequency spectrum band may include performing a listen before talk (LBT) procedure for each channel. An LBT procedure may include performing a clear channel assessment (CCA) procedure or an extended CCA (eCCA) procedure, to determine whether a channel of the unlicensed radio frequency spectrum band is available. When it is determined that the channel of the unlicensed radio frequency spectrum band is available, a channel reservation signal (e.g., a channel usage beacon signal (CUBS)) may be transmitted to reserve the channel. A device that receives the channel reservation signal may defer accessing the channel.

SUMMARY

The present disclosure, for example, relates to wireless communication systems, and more particularly to synchronizing and desynchronizing contention for access to a plurality of channels of an unlicensed radio frequency spectrum band. When contending for access to a plurality of channels of an unlicensed radio frequency spectrum band, a device (e.g., a base station or user equipment (UE)) may in some examples perform an extended clear channel assessment (eCCA) procedure for each channel. Each of the eCCA procedures may be performed over a plurality of CCA slots and may be based on a respective counter of a plurality of counters. When a channel is determined to be clear during a CCA slot, the counter corresponding to the channel may be decremented. When a channel is determined to be busy during a CCA slot, the counter corresponding to the channel may not be decremented. When a counter reaches a final count (e.g., zero), contention for access to the channel corresponding to the counter may be won.

Prior to starting the eCCA procedures to contend for access to the plurality of channels, the plurality of counters may be initialized to a same value (meaning the counters are synchronized) or different values (meaning the counters are not synchronized). In some examples, the eCCA procedures for different channels may begin at different times, regardless of whether initial values of counters corresponding to the different channels are initialized to a same value or different values. Thus, there may be times when two or more groups of the counters are synchronized, and times when two or more groups of the counters are not synchronized (i.e., desynchronized). When a first counter corresponding to a first channel and a second counter corresponding to a second channel are synchronized, the first counter and second counter may reach final counts at the same time, and a device may win contention for access to both the first channel and the second channel in parallel. However, when the first counter and the second counter are not synchronized, one of the counters may reach a final count earlier than the other counter, and the device may win contention for access to either the first channel or the second channel. When the device is the only device contending for access to the plurality of channels within an energy detection range of the device, it may improve the transmission or reception bandwidth of the device if the plurality of counters corresponding to the plurality of channels are synchronized, so that the device may win contention for access to all of the channels in parallel. When multiple devices are contending for access to the plurality of channels in parallel, it may improve fairness of access (and also enable a higher transmit power per channel) if the plurality of counters are desynchronized, so that the device is likely to win contention for access to a first set of one or more channels based on the number of devices contending for access to the channels, and one or more other devices may win contention for access to one or more other sets of channels at the same time (e.g., so multiple devices may transmit or receive in parallel, in a frequency-division multiplexing (FDM) mode). Techniques described in the present disclosure thus provide for synchronizing and desynchronizing contention for access to a plurality of channels under various conditions.

In one example, a method for wireless communication may include identifying a plurality of counters used to contend for access to a plurality of channels of an unlicensed radio frequency spectrum band. Each of the plurality of counters may be associated with a respective channel of the plurality of channels of the unlicensed radio frequency spectrum band. The method may also include measuring at least one channel of the plurality of channels of the unlicensed radio frequency spectrum band. The measuring may be associated with a contention for access to the at least one channel of the unlicensed radio frequency spectrum band.

The method may also include synchronizing or desynchronizing at least a subset of the plurality of counters based at least in part on the measuring.

In some examples of the method, the synchronizing or desynchronizing may include desynchronizing at least a first counter associated with contention for access to a first channel and a second counter associated with contention for access to a second channel when the measuring indicates a channel energy above an energy threshold on at least one of the first channel and the second channel. In some examples, the method may include performing the measuring during a time interval, and the synchronizing or desynchronizing may include splitting the plurality of counters into a first group of counters and a second group of counters when the measuring during the time interval indicates a channel energy above an energy threshold on each of the plurality of channels. In some examples, the time interval may include a CCA slot.

In some examples, the method may include performing the measuring during a time interval, and the synchronizing or desynchronizing may include synchronizing at least a first counter associated with contention for access to a first channel and a second counter associated with contention for access to a second channel when the measuring during the time interval indicates a channel energy below an energy threshold on each of the first channel and the second channel. In some examples, the time interval may include a resynchronization slot belonging to a set of periodic resynchronization slots. In some examples, the synchronizing may include synchronizing the first counter and the second counter to a maximum of a first current value of the first counter and a second current value of the second counter.

In some examples of the method, the plurality of counters may include a first counter associated with contention for access to a first channel and a second counter associated with contention for access to a second channel, and the synchronizing or desynchronizing may include setting a first current value of the first counter to a second current value of the second counter, and deferring transmission on the first channel, upon reaching a first final count of the first counter before reaching a second final count of the second counter and determining a resynchronization flag is set. In some examples, the method may include setting the resynchronization flag during an initialization procedure. In some examples, the method may include computing a fraction of time that the device transmits over a predetermined number of channels of the unlicensed radio frequency spectrum band in parallel within an evaluation period, and setting the resynchronization flag based at least in part on the fraction of time satisfying a threshold.

In some examples, the method may include performing an eCCA procedure to contend for access to a first channel of the plurality of channels. The eCCA procedure may be based at least in part on a counter of the plurality of counters. In some examples, the synchronizing or desynchronizing may include performing a CCA procedure, upon winning contention for access to the first channel, to contend for access to a second channel of the plurality of channels, and winning contention for access to the second channel upon successfully performing the eCCA procedure and the CCA procedure.

In another example, an apparatus for wireless communication at a device may include means for identifying a plurality of counters used to contend for access to a plurality of channels of an unlicensed radio frequency spectrum band. Each of the plurality of counters may be associated with a respective channel of the plurality of channels of the unlicensed radio frequency spectrum band. The apparatus may also include means for measuring at least one channel of the plurality of channels of the unlicensed radio frequency spectrum band. The measuring may be associated with a contention for access to the at least one channel of the plurality of channels of the unlicensed radio frequency spectrum band. The apparatus may also include means for synchronizing or desynchronizing at least a subset of the plurality of counters based at least in part on the measuring.

In some examples of the apparatus, the means for synchronizing or desynchronizing may include means for desynchronizing at least a first counter associated with contention for access to a first channel and a second counter associated with contention for access to a second channel when the measuring indicates a channel energy above an energy threshold on at least one of the first channel and the second channel. In some examples, the apparatus may include means for performing the measuring during a time interval, and the means for synchronizing or desynchronizing may include means for splitting the plurality of counters into a first group of counters and a second group of counters when the measuring during the time interval indicates a channel energy above an energy threshold on each of the plurality of channels. In some examples, the time interval may include a CCA slot.

In some examples, the apparatus may include means for performing the measuring during a time interval, and the means for synchronizing or desynchronizing may include means for synchronizing at least a first counter associated with contention for access to a first channel and a second counter associated with contention for access to a second channel when the measuring during the time interval indicates a channel energy below an energy threshold on each of the first channel and the second channel. In some examples, the time interval may include a resynchronization slot belonging to a set of periodic resynchronization slots. In some examples, the means for synchronizing may include means for synchronizing the first counter and the second counter to a maximum of a first current value of the first counter and a second current value of the second counter.

In some examples of the apparatus, the plurality of counters may include a first counter associated with contention for access to a first channel and a second counter associated with contention for access to a second channel, and the means for synchronizing or desynchronizing may include means for setting a first current value of the first counter to a second current value of the second counter, and deferring transmission on the first channel, upon reaching a first final count of the first counter before reaching a second final count of the second counter and determining a resynchronization flag is set. In some examples, the apparatus may include means for setting the resynchronization flag during an initialization procedure. In some examples, the apparatus may include means for computing a fraction of time that the device transmits over a predetermined number of channels of the unlicensed radio frequency spectrum band in parallel within an evaluation period, and means for setting the resynchronization flag based at least in part on the fraction of time satisfying a threshold.

In some examples, the apparatus may include means for performing an eCCA procedure to contend for access to a first channel of the plurality of channels. The eCCA procedure may be based at least in part on a counter of the plurality of counters. In some examples, the means for synchronizing or desynchronizing may include means for performing a CCA procedure, upon winning contention for access to the first channel, to contend for access to a second channel of the plurality of channels, and means for winning contention for access to the second channel upon successfully performing the eCCA procedure and the CCA procedure.

In another example, an apparatus for wireless communication at a device may include a processor, and a memory in electronic communication with the processor. The processor and the memory may be configured to identify a plurality of counters used to contend for access to a plurality of channels of an unlicensed radio frequency spectrum band. Each of the plurality of counters may be associated with a respective channel of the plurality of channels of the unlicensed radio frequency spectrum band. The processor and the memory may also be configured to measure at least one channel of the plurality of channels of the unlicensed radio frequency spectrum band. The measuring may be associated with a contention for access to the at least one channel of the plurality of channels of the unlicensed radio frequency spectrum band. The processor and the memory may also be configured to synchronize or desynchronize at least a subset of the plurality of counters based at least in part on the measuring.

In some examples of the apparatus, the synchronizing or desynchronizing may include desynchronizing at least a first counter associated with contention for access to a first channel and a second counter associated with contention for access to a second channel when the measuring indicates a channel energy above an energy threshold on at least one of the first channel and the second channel. In some examples, the processor and the memory may be configured to perform the measuring during a time interval, and the synchronizing or desynchronizing may include splitting the plurality of counters into a first group of counters and a second group of counters when the measuring during the time interval indicates a channel energy above an energy threshold on each of the plurality of channels. In some examples, the processor and the memory may be configured to perform the measuring during a time interval, and the synchronizing or desynchronizing may include synchronizing at least a first counter associated with contention for access to a first channel and a second counter associated with contention for access to a second channel when the measuring during the time interval indicates a channel energy below an energy threshold on each of the first channel and the second channel.

In some examples of the apparatus, the plurality of counters may include a first counter associated with contention for access to a first channel and a second counter associated with contention for access to a second channel, and the synchronizing or desynchronizing may include setting a first current value of the first counter to a second current value of the second counter, and deferring transmission on the first channel, upon reaching a first final count of the first counter before reaching a second final count of the second counter and determining a resynchronization flag is set. In some examples, the processor and the memory may be configured to set the resynchronization flag during an initialization procedure. In some examples, the processor and the memory may be configured to compute a fraction of time that the device transmits over a predetermined number of channels of the unlicensed radio frequency spectrum band in parallel within an evaluation period, and to set the resynchronization flag based at least in part on the fraction of time satisfying a threshold.

In another example, a non-transitory computer-readable medium storing computer-executable code for wireless communication may include code, executable by a processor, to identify a plurality of counters used to contend for access to a plurality of channels of an unlicensed radio frequency spectrum band. Each of the plurality of counters may be associated with a respective channel of the plurality of channels of the unlicensed radio frequency spectrum band. The code may also be executable by the processor to measure at least one channel of the plurality of channels of the unlicensed radio frequency spectrum band. The measuring may be associated with a contention for access to the at least one channel of the plurality of channels of the unlicensed radio frequency spectrum band. The code may also be executable by the processor to synchronize or desynchronize at least a subset of the plurality of counters based at least in part on the measuring.

In some examples of the non-transitory computer-readable medium, the code may also be executable by the processor to perform the measuring during a time interval, and the code executable by the processor to synchronize or desynchronize may include code executable by the processor to split the plurality of counters into a first group of counters and a second group of counters when the measuring during the time interval indicates a channel energy above an energy threshold on each of the plurality of channels. In some examples, the code may also be executable by the processor to perform the measuring during a time interval, and the code executable by the processor to synchronize or desynchronize may include code executable by the processor to synchronize at least a first counter associated with contention for access to a first channel and a second counter associated with contention for access to a second channel when the measuring during the time interval indicates a channel energy below an energy threshold on each of the first channel and the second channel. In some examples, the plurality of counters may include a first counter associated with contention for access to a first channel and a second counter associated with contention for access to a second channel, and the code executable by the processor to synchronize or desynchronize may include code executable by the processor to set a first current value of the first counter to a second current value of the second counter, and defer transmission on the first channel, upon reaching a first final count of the first counter before reaching a second final count of the second counter and determining a resynchronization flag is set.

The foregoing has outlined rather broadly the techniques and technical advantages of examples according to the disclosure in order that the detailed description that follows may be better understood. Additional techniques and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present invention may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Techniques are described for synchronizing and desynchronizing contention for access to a plurality of channels of an unlicensed radio frequency spectrum band. In some examples, the unlicensed radio frequency spectrum band may be used for "3rd Generation Partnership Project" (3GPP) Long Term Evolution (LTE) or LTE-Advanced (LTE-A) communications. The unlicensed radio frequency spectrum band may be used in combination with, or independent from, a licensed radio frequency spectrum band. The licensed radio frequency spectrum band may be a radio frequency spectrum band for which transmitting apparatuses may not contend for access because the radio frequency spectrum band is licensed to one or more users for one or more uses. The unlicensed radio frequency spectrum band may be a radio frequency spectrum band for which a device may contend for access (e.g., a radio frequency spectrum band that is available for Wi-Fi use, or a radio frequency spectrum band that is available for use by multiple operators in an equally shared or prioritized manner). In some examples, the channels for which contention for access is synchronized or desynchronized may include channels used in an enhanced component carrier (eCC) mode of operation (e.g., a mode in which a device may transmit or receive, in parallel, over combinations of up to four (or up to eight) 20 MHz channels). When contention for access to a plurality of channels is synchronized for a device, the device may win contention for access to the plurality of channels in a time-division multiplexing (TDM) manner with respect to other devices that are contending for access to the plurality of channels. When contention for access to the plurality of channels is desynchronized for a device, the device may win contention for access to a first set of one or more channels in parallel with one or more other devices winning contention for access to at least one other set of one or more channels.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, techniques described with respect to some examples may be combined in other examples.

Figure 1:
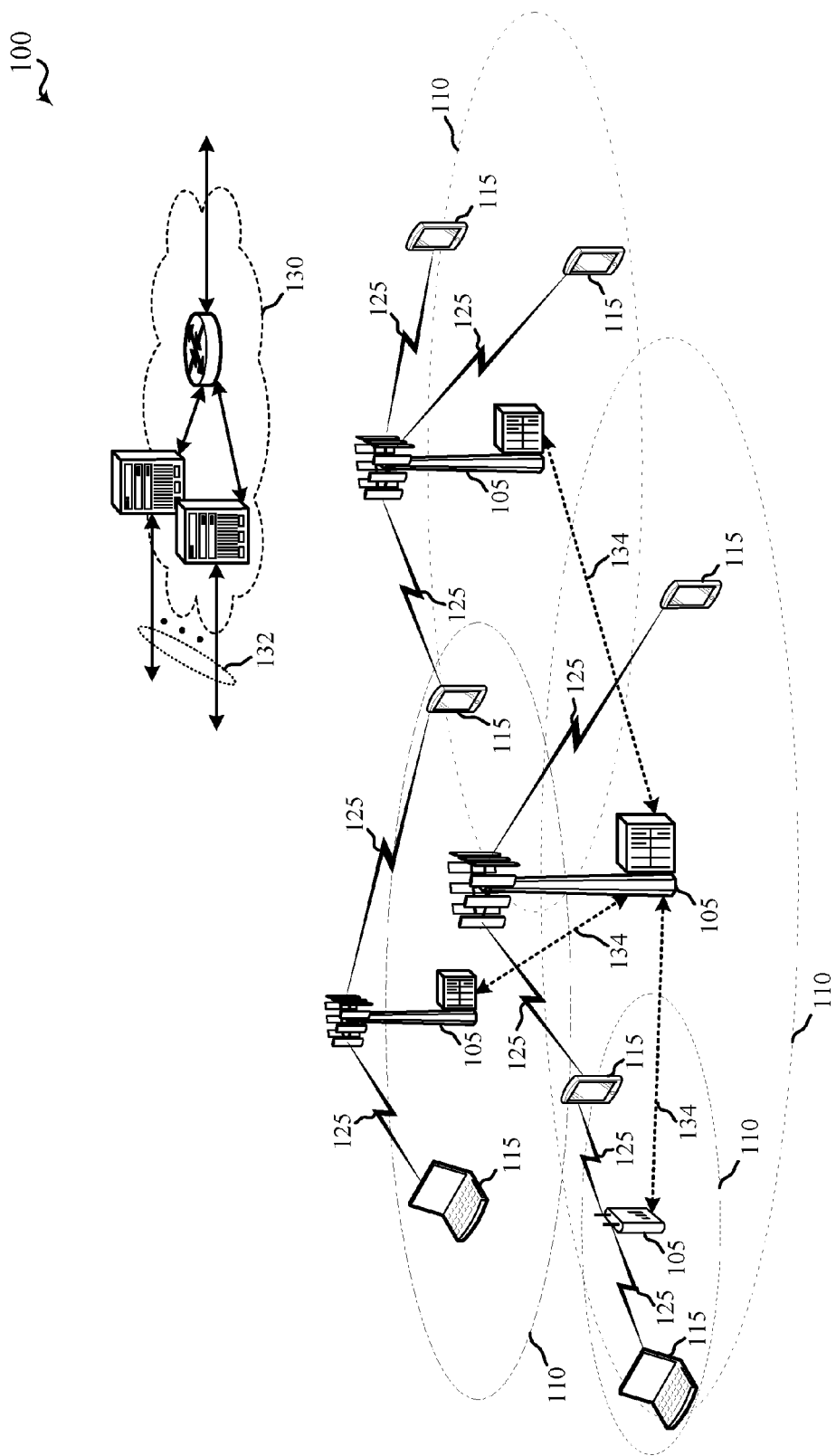
FIG. 1 illustrates an example of a wireless communication system, in accordance with various aspects of the present disclosure.

FIG. 1 illustrates an example of a wireless communication system 100, in accordance with various aspects of the present disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via at least one base station antenna. Each of the base station sites may provide communication coverage for a respective geographic coverage area 110. In some examples, a base station may be referred to as a base transceiver station, a radio base station, an access point, a radio transceiver, a NodeB, an eNB, a Home NodeB, a Home eNodeB, or some other suitable terminology. The geographic coverage area 110 for a base station 105 may be divided into sectors making up a portion of the coverage area (not shown). The wireless communication system 100 may include base stations 105 that cover different coverage areas (e.g., macro or small cell base stations). There may be overlapping geographic coverage areas for different technologies.

In some examples, the wireless communication system 100 may include an LTE/LTE-A network. In LTE/LTE-A networks, the term eNB may be used to describe the base stations 105 (or entities including one or more base stations 105). The wireless communication system 100 may be a Heterogeneous LTE/LTE-A network in which different eNBs provide coverage for various geographical regions. For example, each eNB or base station may provide communication coverage for a macro cell, a small cell, or others of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs 115 with service subscriptions with the network provider. A small cell may be a lower-powered base station, as compared with a macro cell that may operate in the same or different (e.g., licensed, unlicensed, etc.) radio frequency spectrums as macro cells. Small cells may include pico cells, femto cells, and micro cells according to various examples. A pico cell may cover a relatively smaller geographic area and may allow unrestricted access by UEs 115 with service subscriptions with the network provider. A femto cell also may cover a relatively small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB or a Home eNB. An eNB may support one or multiple (e.g., two, three, four, and the like) cells (e.g., component carriers).

The wireless communication system 100 may support synchronous or asynchronous operation. For synchronous operation, the base stations 105 may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Physical Data Convergence Protocol (PDCP) layer may be IP-based. A Medium Access Control (MAC) layer may perform packet segmentation and reassembly to communicate over logical channels, and may also perform priority handling and multiplexing of logical channels into transport channels. The MAC layer may also use Hybrid Automatic Repeat reQuest (HARD) to provide retransmission at the MAC layer to improve link efficiency. In the control plane, a Radio Resource Control (RRC) protocol layer may provide establishment, configuration, and maintenance of an RRC connection between a UE and the base stations 105 or core network 130 supporting radio bearers for the user plane data. At the physical (PHY) layer, transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a wireless communication device, a personal computer (e.g., a laptop computer, a netbook computer, a tablet computer, etc.), a handheld device, a cellular telephone, a smart phone, a cordless phone, a wireless modem, a wireless local loop (WLL) station, a personal digital assistant (PDA), a digital video recorder (DVR), an internet appliance, a gaming console, an e-reader, etc. A UE 115 may be able to communicate with various base stations and network equipment, including macro eNBs, small cell eNBs, relay base stations, and the like. A UE 115 may also be able to communicate using different radio access technologies (RATs), such as a cellular RAT (e.g., an LTE/LTE-A RAT), a Wi-Fi RAT, or other RATs.

In some examples of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

Base stations 105 and UEs 115 may communicate over the communication links 125 using carriers, which may also be referred to as CCs, layers, channels, etc. The term "component carrier" or CC may refer to each of the multiple carriers utilized by a UE 115 operating in a carrier aggregation (CA) mode, and may be distinct from other portions of system bandwidth. For instance, a CC may be a relatively narrow-bandwidth carrier capable of being utilized independently or in combination with other component carriers. Each CC may provide the same capabilities as an isolated carrier based on release 8 or release 9 of the LTE standard. Multiple CCs may be aggregated or utilized concurrently to provide some UEs 115 with greater bandwidth and, e.g., higher data rates. Thus, individual CCs may be backwards compatible with legacy UEs (e.g., UEs 115 implementing LTE release 8 or release 9); while other UEs 115 (e.g., UEs 115 implementing post-release 8/9 LTE versions), may be configured with multiple CCs in a multi-carrier mode. A carrier used for downlink (DL) transmissions may be referred to as a DL CC, and a carrier used for uplink (UL) transmissions may be referred to as an UL CC. A UE 115 may be configured with multiple DL CCs and one or more UL CCs for carrier aggregation. Each carrier may be used to transmit control information (e.g., reference signals, control channels, etc.), overhead information, data, etc.

A UE 115 may communicate with a single base station utilizing multiple carriers, and may also communicate with multiple base stations simultaneously on different carriers. Each cell of a base station may include an UL CC and a DL CC. The geographic coverage area 110 of each serving cell for a base station 105 may be different (e.g., CCs on different frequency bands may experience different path loss). In some examples, one carrier is designated as the primary carrier, or primary component carrier (PCC), for a UE 115, which may be served by a primary cell (PCell). Primary cells may be semi-statically configured by higher layers (e.g., RRC, etc.) on a per-UE basis. Some uplink control information (UCI), e.g., acknowledgement (ACK)/negative acknowledgment (NAK), channel quality indicator (CQI), and scheduling information transmitted on a physical uplink control channel (PUCCH), are carried by the PCell. Additional carriers may be designated as secondary carriers, or secondary component carriers (SCC), which may be served by secondary cells (SCells). Secondary cells may likewise be semi-statically configured on a per-UE basis. In some cases, SCells may not include or be configured to transmit the same control information as the PCell.

In some cases, wireless communication system 100 may utilize one or more eCCs. An SCell may, for instance, be an eCC. An eCC may be characterized by one or more features including: wider bandwidth, shorter symbol duration, shorter transmission time intervals (TTIs), and modified control channel configuration. In some cases, an eCC may be associated with operation in a CA mode or a dual connectivity mode (i.e., when multiple serving cells have a suboptimal backhaul link). An eCC may also be configured for use in an unlicensed radio frequency spectrum band (where more than one operator is allowed to use the radio frequency spectrum band). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other component carriers (CCs), which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 Mhz, etc.) at reduced symbol durations (e.g., 16.67 µs). A TTI in eCC may consists of one or multiple symbols. In some cases, the TTI duration (that is, the number of symbols in a TTI) may be variable.

Figure 2A:
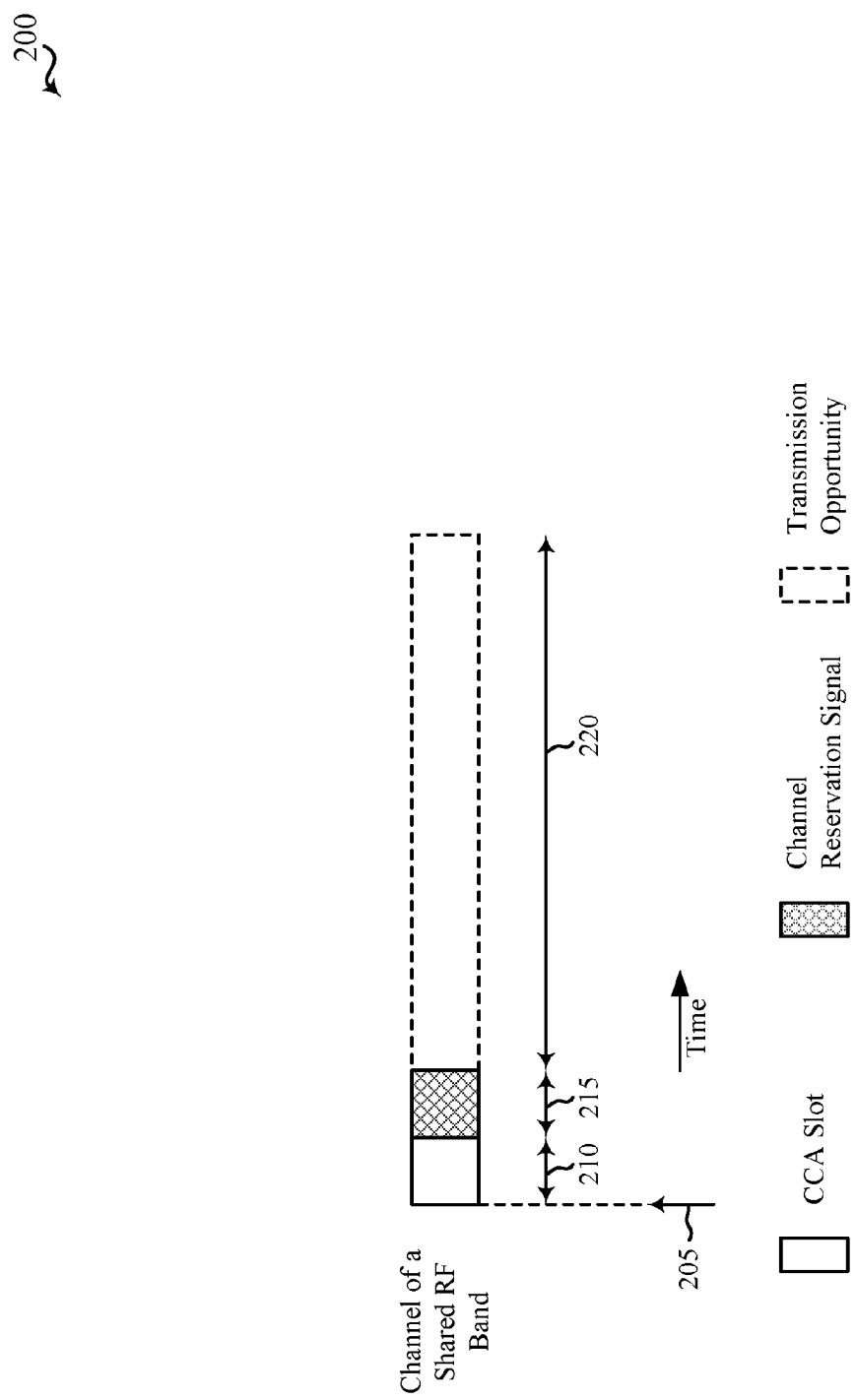
FIG. 2A shows a timeline of contention for access to a channel of an unlicensed radio frequency spectrum band, by a device, in accordance with various aspects of the present disclosure.
Figure 2B:
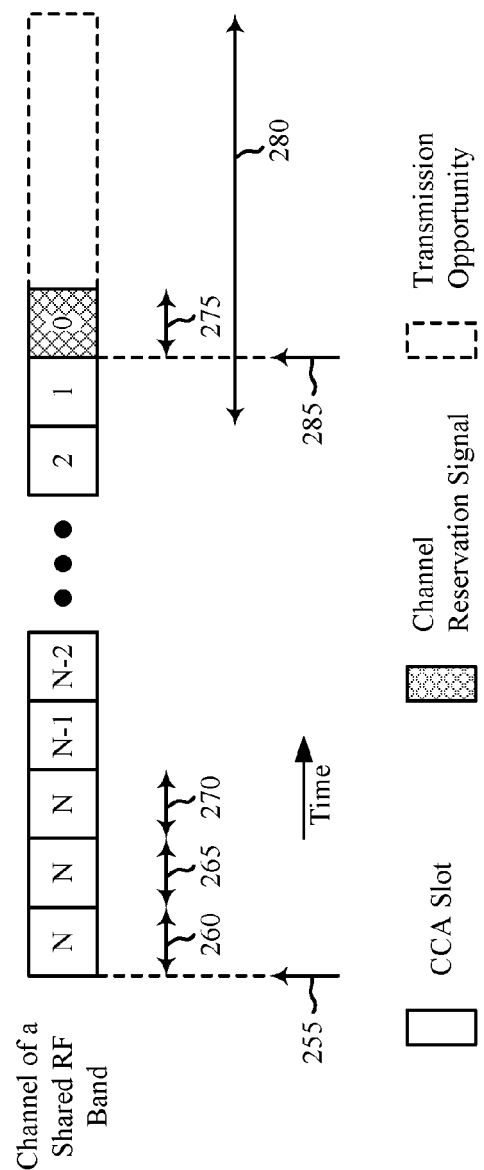
FIG. 2B shows a timeline of contention for access to a channel of an unlicensed radio frequency spectrum band, by a device, in accordance with various aspects of the present disclosure.

In some examples, a base station 105 or UE 115 may contend for access to a channel of the unlicensed radio frequency spectrum band before transmitting over the channel. In some examples, a base station 105 or UE 115 may also contend for access to a channel of the unlicensed radio frequency spectrum band before receiving over the channel. FIGS. 2A and 2B show two different ways in which a device (e.g., a base station 105 or UE 115) may contend for access to a channel of an unlicensed radio frequency spectrum band.

FIG. 2A shows a timeline 200 of contention for access to a channel of an unlicensed radio frequency spectrum band, by a device, in accordance with various aspects of the present disclosure. In some examples, the device may be one of the base stations 105 or UEs 115 described with reference to FIG. 1.

At a time 205, the device may begin a CCA procedure during a CCA slot 210. The CCA procedure may include detecting an energy on the channel of the unlicensed radio frequency spectrum band during the CCA slot 210. When the device determines the detected energy is within (e.g., below) an energy threshold, the channel may be considered clear for use and the device may transmit a channel reservation signal 215 (e.g., a CUBS) over the channel. Transmission of the channel reservation signal 215 may reserve the channel for a subsequent transmission opportunity 220, by causing devices that receive the channel reservation signal 215 to refrain from accessing the channel for a time indicated in a network allocation vector (NAV) or other indicator included in the channel reservation signal 215. Following transmission of the channel reservation signal 215, the device may transmit or receive over the channel of the unlicensed radio frequency spectrum band during the subsequent transmission opportunity 220.

When the device determines the energy detected on the channel during the CCA slot 210 exceeds the energy threshold, the channel may be considered busy and the device may refrain from accessing the channel for a period of time.

FIG. 2B shows a timeline 250 of contention for access to a channel of an unlicensed radio frequency spectrum band, by a device, in accordance with various aspects of the present disclosure. In some examples, the device may be one of the base stations 105 or UEs 115 described with reference to FIG. 1.

At a time 255, the device may begin an eCCA procedure. The eCCA procedure may be performed over a plurality of CCA slots including CCA slots 260, 265, 270, etc. The eCCA procedure may include initializing the value of a counter to a random number, N, and then detecting an energy on the channel during each of a plurality of CCA slots (including CCA slots 260, 265, 270, etc.). Upon determining the energy detected during a CCA slot is within (e.g., below) an energy threshold, the device may decrement the value of the counter. Upon determining the energy detected during a CCA slot exceeds the energy threshold, the device may not decrement the value of the counter.

When the counter reaches a final count (e.g., zero), the channel may be considered clear for use and the device may transmit a channel reservation signal 275 (e.g., a CUBS) over the channel. Transmission of the channel reservation signal 275 may reserve the channel for a subsequent transmission opportunity 280, by causing devices that receive the channel reservation signal 275 to refrain from accessing the channel for a time indicated in a NAV or other indicator included in the channel reservation signal 275. Following transmission of the channel reservation signal 275, the device may transmit or receive over the channel of the unlicensed radio frequency spectrum band for a remainder of the subsequent transmission opportunity 280. By way of example, FIG. 2B shows the device winning contention for access to the channel at a time 285 within the subsequent transmission opportunity 280.

FIGS. 2A and 2B show how a device may contend for access to a single channel of an unlicensed radio frequency spectrum band. However, in some examples, the device may contend for access to a plurality of channels of an unlicensed radio frequency spectrum band in parallel. When contending for access to the plurality of channels, the device may contend for access to the plurality of channels synchronously or asynchronously. When the device contends for access to the plurality of channels synchronously, the device may win contention for access to all of the channels, thus maximizing a transmission or reception bandwidth of the device. However, losing contention for access to any one of the channels may prevent the device from winning contention for access to all of the channels, thus preventing the device from transmitting or receiving over the channels. When the device contends for access to the plurality of channels asynchronously, the device may increase its chance of winning contention for access to at least one of the channels; however, winning contention for access to a first channel shortly before the device would have won contention for access to a second channel may prevent the device from transmitting or receiving over an optimal number of the channels. A balance between synchronizing and desynchronizing contention for access to a plurality of channels can therefore be useful.

Figure 3:
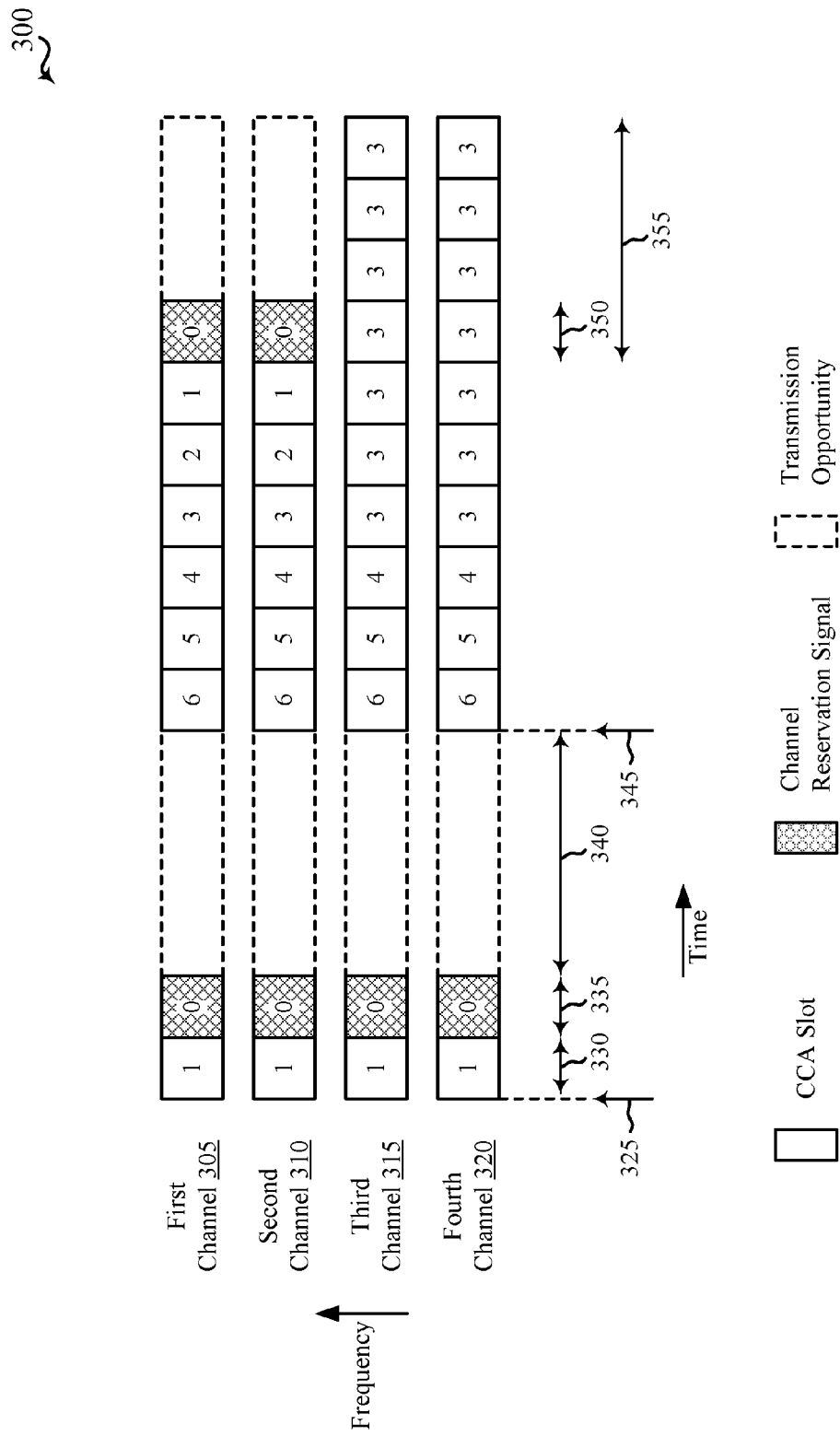
FIG. 3 shows a timeline of contention for access to a plurality of channels of an unlicensed radio frequency spectrum band, by a device, in accordance with various aspects of the present disclosure.

FIG. 3 shows a timeline 300 of contention for access to a plurality of channels of an unlicensed radio frequency spectrum band, by a device, in accordance with various aspects of the present disclosure. In some examples, the device may be one of the base stations 105 or UEs 115 described with reference to FIG. 1.

By way of example, the plurality of channels may include a first channel 305, a second channel 310, a third channel 315, and a fourth channel 320. Also by way of example, a plurality of counters may be used to contend for access to the plurality of channels, with a first counter being associated with the first channel 305, a second counter being associated with the second channel 310, a third counter being associated with the third channel 315, and a fourth counter being associated with the fourth channel 320. The value of a counter associated with a channel, at the beginning of a time interval shown in FIG. 3, is indicated within the time interval. For example, the value of the first counter at the beginning of CCA slot 330 is one, as indicated within the intersection of the CCA slot 330 and the timeline for the first channel 305.

At a time 325, the device may contend for access to each of the plurality of channels, in parallel, for a first transmission opportunity 340. Assuming that the device is not in the middle of an ongoing eCCA procedure for any of the channels, the counters (e.g., the first counter, second counter, third counter, and fourth counter) for the first channel 305, second channel 310, third channel 315, and fourth channel 320 may be initialized to the same value, which value may be one. The initialization of the counters to the same value, and to one, may be based on a presumption that the device is likely to be the only device contending for access to the plurality of channels within the energy detection range of the device. In addition to initializing the values of the counters to one, a respective CCA procedure may be performed for each of the channels. The CCA procedures may be performed during a CCA slot 330, as described with reference to FIG. 2A. By way of example, FIG. 3 shows the device to have won contention for access to each of the plurality of channels after performing the CCA procedures (i.e., the values of the first counter, the second counter, the third counter, and the fourth counter are zero in the time interval following the CCA slot 330).

After winning contention for access to the plurality of channels for the first transmission opportunity 340, the device may transmit a channel reservation signal 335 over each of the channels. Following transmission of the channel reservation signal 335, the device may transmit or receive over the plurality of channels of the unlicensed radio frequency spectrum band during the first transmission opportunity 340.

Following the first transmission opportunity 340, at a time 345, the device may contend for access to each of the plurality of channels, in parallel, for a second transmission opportunity 355. The second transmission opportunity 355 may directly follow the first transmission opportunity 340, or may be separated in time from the first transmission opportunity 340 (e.g., by one or more other transmission opportunities, or by a period of no access to the plurality of channels by the device). By way of example, the device is shown to perform an eCCA procedure for each of the channels. Each of the eCCA procedures may be performed over multiple CCA slots, as described with reference to FIG. 2B.

As shown, each of the counters (e.g., the first counter, the second counter, the third counter, and the fourth counter) may be initialized to a same value, N (e.g., N=6). In alternative examples, the counters may be initialized to a same value or different values (e.g., the first counter may be initialized to a random value N1; the second counter may be initialized to a random value N2; the third counter may be initialized to a random value N3; and the fourth counter may be initialized to a random value N4). The value of a counter (e.g., the first counter, the second counter, the third counter, and the fourth counter) may be decremented or maintained during a CCA slot, depending on whether a channel corresponding to the counter is determined to have an energy within or exceeding an energy threshold during the CCA slot.

When a first set of one or more channels is determined to be clear during a CCA slot, and a second set of one or more channels is determined to be busy during a CCA slot, counters corresponding to the first set of one or more channels may be decremented during the CCA slot, and counters corresponding to the second set of one or more channels may not be decremented during the CCA slot. This may result in one or more counters reaching a final count (e.g., zero) before other counters. When this happens, the device may win contention for access to the channel(s) corresponding to the counter(s) that have reached a final count, but not win contention for access to one or more other channels. Alternatively, when all of the counters reach the final count together, the device may win contention for access to all of the channels in parallel. By way of example, FIG. 3 shows the device winning contention for access to the first channel 305 and the second channel 310, but not the third channel 315 and the fourth channel 320, for the second transmission opportunity 355. Upon winning contention for access to the first channel 305 and the second channel 310 for the second transmission opportunity 355, the device may transmit a channel reservation signal 350 over each of the first channel 305 and the second channel 310.

Under some conditions, it may be useful to synchronize or desynchronize the counters used in contending for access to a plurality of channels of an unlicensed radio frequency spectrum band in parallel. Synchronization of counters may be useful in increasing a device's transmission or reception bandwidth when it is possible (or likely) that a relatively small time delay may result in contention for access to more (or all) channels of the unlicensed radio frequency spectrum band being won. Desynchronization of counters may be useful in achieving fairness (and improving transmit power per channel) when it is possible (or likely) that multiple devices are contending for access to the unlicensed radio frequency spectrum band in parallel. Examples of counter synchronization and desynchronization are described with reference to FIGS. 4-6.

Figure 4:
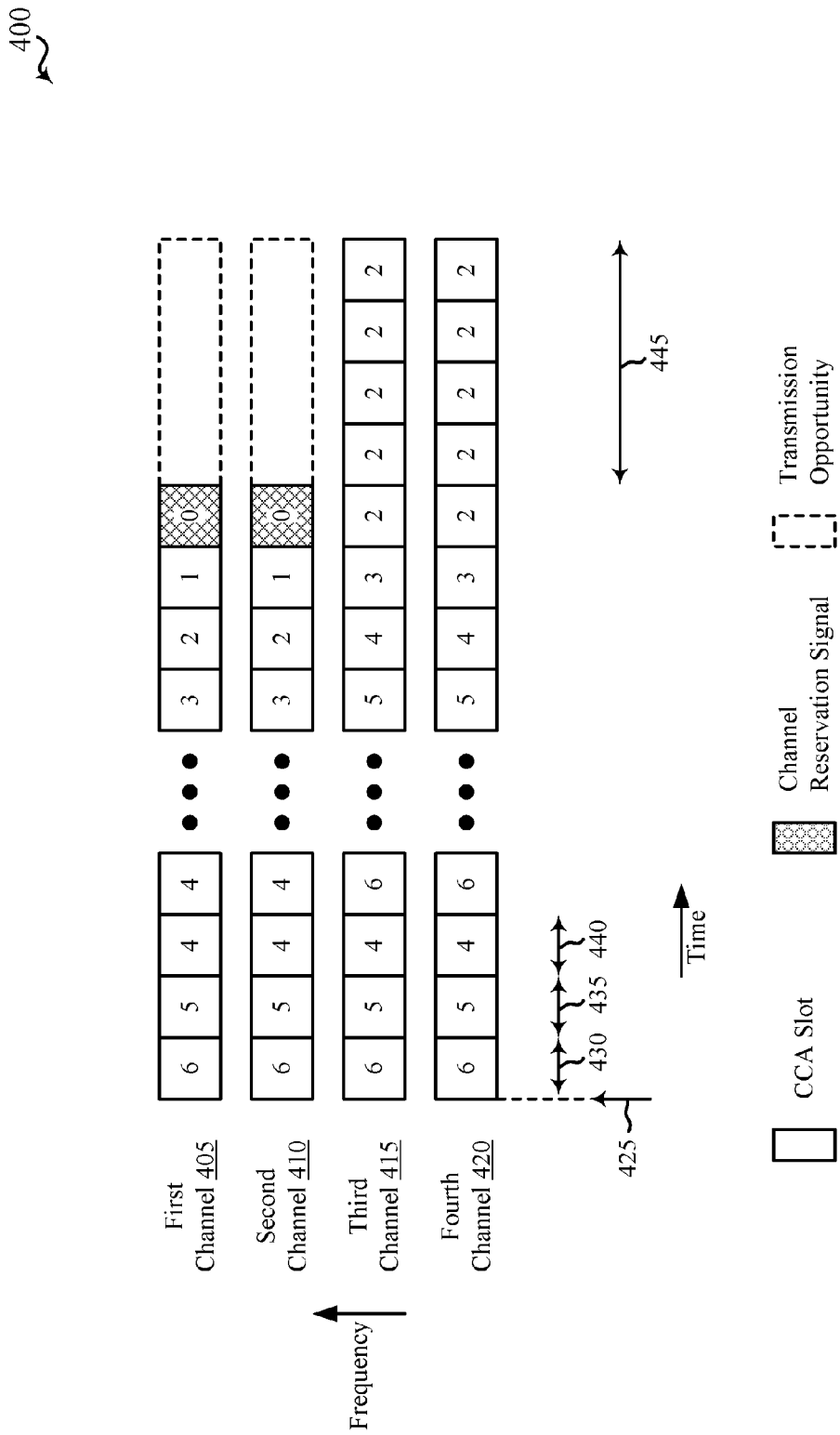
FIG. 4 shows a timeline of contention for access to a plurality of channels of an unlicensed radio frequency spectrum band, by a device, in accordance with various aspects of the present disclosure.

FIG. 4 shows a timeline 400 of contention for access to a plurality of channels of an unlicensed radio frequency spectrum band, by a device, in accordance with various aspects of the present disclosure. In some examples, the device may be one of the base stations 105 or UEs 115 described with reference to FIG. 1.

By way of example, the plurality of channels may include a first channel 405, a second channel 410, a third channel 415, and a fourth channel 420. Also by way of example, a plurality of counters may be used to contend for access to the plurality of channels, with a first counter being associated with the first channel 405, a second counter being associated with the second channel 410, a third counter being associated with the third channel 415, and a fourth counter being associated with the fourth channel 420. The value of a counter associated with a channel, at the beginning of a time interval shown in FIG. 4, is indicated within the time interval. For example, the value of the first counter at the beginning of a first CCA slot 430 is six, as indicated within the intersection of the first CCA slot 430 and the timeline for the first channel 405.

At a time 425, the device may contend for access to each of the plurality of channels, in parallel, for a transmission opportunity 445. By way of example, the device is shown to perform an eCCA procedure for each of the channels. Each of the eCCA procedures may be performed over multiple CCA slots, as described with reference to FIG. 2B. As shown, each of the counters (e.g., the first counter, the second counter, the third counter, and the fourth counter) may be initialized to a same value, N (e.g., N=6) before starting the eCCA procedures, thus synchronizing the counters and the performance of the eCCA procedures.

While performing the eCCA procedures, the device may detect an energy within an energy threshold on each of the channels (e.g., the first channel 405, the second channel 410, the third channel 415, and the fourth channel 420) during each of the first CCA slot 430 and the second CCA slot 435. Thus, the counters (e.g., the first counter, the second counter, the third counter, and the fourth counter) may be decremented during each of the first CCA slot 430 and the second CCA slot 435, and each of the counters may have a value of four at the beginning of a third CCA slot 440. During the third CCA slot 440, an energy exceeding the energy threshold may be detected on each of the channels. Because energy is simultaneously detected on each of the channels, it may be presumed that the device is contending for access to the plurality of channels along with one other device, and the counters may be split into a first group of counters and a second group of counters. By way of example, the first counter and the second counter may be included in the first group of counters, and the third counter and the fourth counter may be included in the second group of counters. Following the split, the counters of one group of counters (e.g., the first group of counters) may retain their current values, and the counters of the other group of counters (e.g., the second group of counters) may be adjusted (e.g., increased or decreased) to a new value. By way of example, the counters of the second group of counters are increased by two in FIG. 4. The groupings of counters may be preconfigured or random.

Following the splitting of the counters into the first group of counters and the second group of counters, the eCCA procedures may continue. However, when the device is contending for access to the plurality of channels in parallel with another device, the splitting (or desynchronization) of the counters makes it relatively more likely that the device will win contention for access to the channels associated with the first group of counters (i.e., the channels associated with the counters having the lower counts), and relatively more likely that the other device will win contention for access to the channels associated with the second group of counters (i.e., the channels associated with the counters having the higher counts). If the two devices win contention for access to different groups of counters in parallel, the two devices may operate in a FDM mode, thereby balancing throughput and fairness in channel access.

In some examples, the splitting shown in FIG. 4 may be performed once per channel access attempt (e.g., once per set of parallel eCCA procedures).

Figure 5:
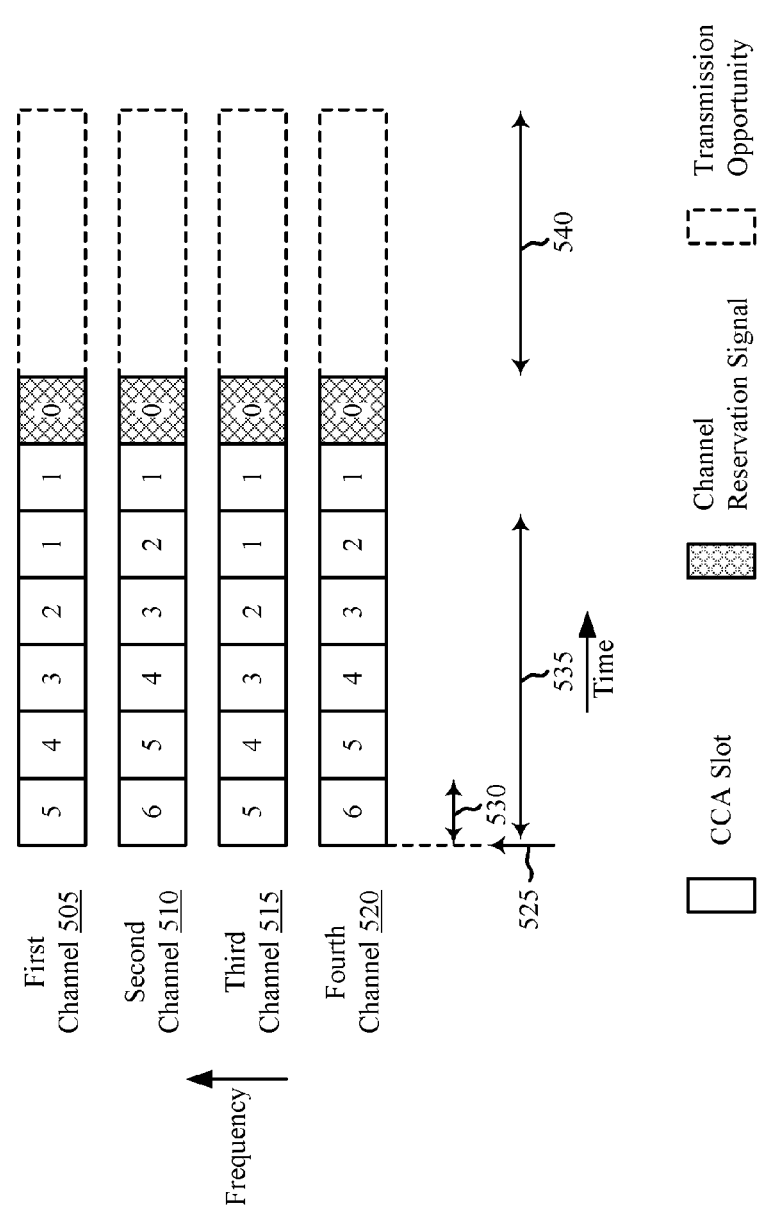
FIG. 5 shows a timeline of contention for access to a plurality of channels of an unlicensed radio frequency spectrum band, by a device, in accordance with various aspects of the present disclosure.

FIG. 5 shows a timeline 500 of contention for access to a plurality of channels of an unlicensed radio frequency spectrum band, by a device, in accordance with various aspects of the present disclosure. In some examples, the device may be one of the base stations 105 or UEs 115 described with reference to FIG. 1.

By way of example, the plurality of channels may include a first channel 505, a second channel 510, a third channel 515, and a fourth channel 520. Also by way of example, a plurality of counters may be used to contend for access to the plurality of channels, with a first counter being associated with the first channel 505, a second counter being associated with the second channel 510, a third counter being associated with the third channel 515, and a fourth counter being associated with the fourth channel 520. The value of a counter associated with a channel, at the beginning of a time interval shown in FIG. 5, is indicated within the time interval. For example, the value of the first counter at the beginning of CCA slot 530 is five, as indicated within the intersection of the CCA slot 530 and the timeline for the first channel 505.

At a time 525, the device may contend for access to each of the plurality of channels, in parallel, for a transmission opportunity 540. By way of example, the device is shown to perform an eCCA procedure for each of the channels. Each of the eCCA procedures may be performed over multiple CCA slots, as described with reference to FIG. 2B. As shown, each of the counters (e.g., the first counter, the second counter, the third counter, and the fourth counter) may be initialized to a same value or different values before starting the eCCA procedures. For example, the first counter may be initialized to a value N1 (e.g., N1=5), the second counter may be initialized to a value N2 (e.g., N2=6), the third counter may be initialized to a value N3 (e.g., N3=5), and the fourth counter may be initialized to a value N4 (e.g., N4=6). Alternatively, the counters may be initialized to a same value. The counters may be initialized to a same value when, for example, transmissions over the channels during a prior transmission opportunity finished at a same time.

As shown in FIG. 5, a resynchronization slot 535 may be defined. In some examples, the resynchronization slot 535 may include one or more CCA slots (e.g., five CCA slots). In some examples, the resynchronization slot 535 may be one of a set of periodic resynchronization slots (e.g., the resynchronization slot 535 may be followed by another resynchronization slot, and so on, depending on the number of CCA slots over which a plurality of eCCA procedures are performed). In other examples, the resynchronization slot 535 may be non-periodic. During each of the CCA slots within the resynchronization slot 535, the device may detect whether an energy on each of the channels is within an energy threshold. When the detected energy is within the energy threshold, for each of the channels and each of the CCA slots included within the resynchronization slot 535, the device may set all of the counters (e.g., the first counter, the second counter, the third counter, and the fourth counter) to a maximum of the current counter values (e.g., one) at the end of the resynchronization slot 535. Thus, in the example shown, each of the counters may be set to one. Alternatively, each of the counters may be set to a different value, such as a minimum of the current counter values. However, adjusting a counter to a value below its current value violates eCCA rules defined by the LBT protocol specified by the European Telecommunications Standards Institute (ETSI).

Following the adjustment of the values of the counters, the eCCA procedures being performed for the channels may continue.

The resynchronization described with reference to FIG. 5 provides a fast synchronization of channel contention procedures when just one device is contending for access to a plurality of channels of an unlicensed radio frequency spectrum band. However, the resynchronization may be unnecessary when the low energy on the channels during the CCA slot represents a brief pause in other devices' contention for access to the plurality of channels (instead of indicating that just one device is contending for access to the plurality of channels).

Figure 6:
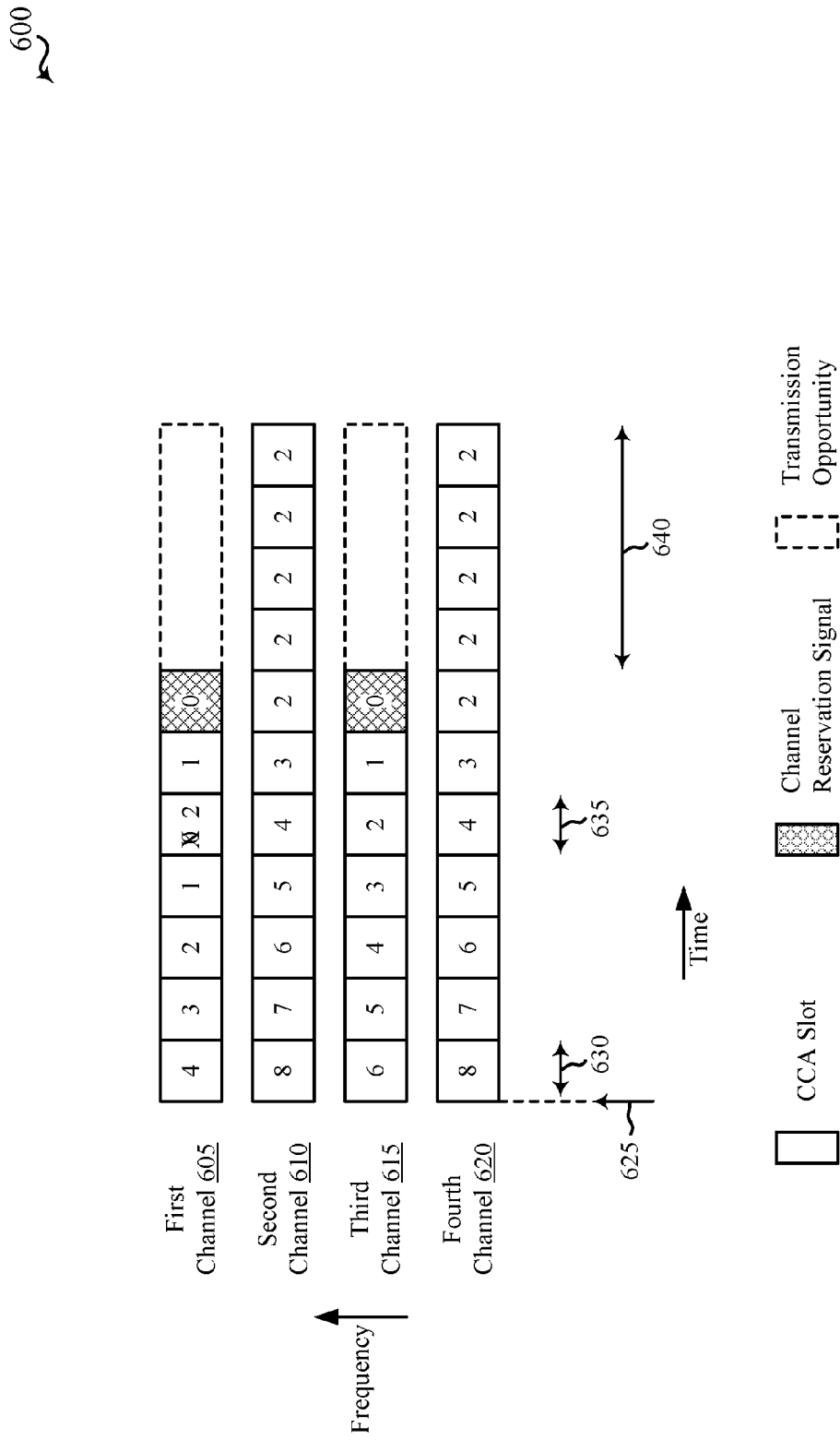
FIG. 6 shows a timeline of contention for access to a plurality of channels of an unlicensed radio frequency spectrum band, by a device, in accordance with various aspects of the present disclosure.

FIG. 6 shows a timeline 600 of contention for access to a plurality of channels of an unlicensed radio frequency spectrum band, by a device, in accordance with various aspects of the present disclosure. In some examples, the device may be one of the base stations 105 or UEs 115 described with reference to FIG. 1.

By way of example, the plurality of channels may include a first channel 605, a second channel 610, a third channel 615, and a fourth channel 620. Also by way of example, a plurality of counters may be used to contend for access to the plurality of channels, with a first counter being associated with the first channel 605, a second counter being associated with the second channel 610, a third counter being associated with the third channel 615, and a fourth counter being associated with the fourth channel 620. The value of a counter associated with a channel, at the beginning of a time interval shown in FIG. 6, is indicated within the time interval. For example, the value of the first counter at the beginning of CCA slot 630 is four, as indicated within the intersection of the CCA slot 630 and the timeline for the first channel 605.

At a time 625, the device may contend for access to each of the plurality of channels, in parallel, for a transmission opportunity 640. By way of example, the device is shown to perform an eCCA procedure for each of the channels. Each of the eCCA procedures may be performed over multiple CCA slots, as described with reference to FIG. 2B. As shown, each of the counters (e.g., the first counter, the second counter, the third counter, and the fourth counter) may be initialized to a same value or different values before starting the eCCA procedures. For example, the first counter may be initialized to a value N1 (e.g., N1=4), the second counter may be initialized to a value N2 (e.g., N2=8), the third counter may be initialized to a value N3 (e.g., N3=6), and the fourth counter may be initialized to a value N4 (e.g., N4=8). Alternatively, the counters may be initialized to a same value. The counters may be initialized to a same value when, for example, transmissions over the channels during a prior transmission opportunity finished at a same time. In either example, the timeline 600 presumes the counters (e.g., the first counter, the second counter, the third counter, and the fourth counter) arrive at two more different values during the CCA slot 635.

At the CCA slot 635, the first counter (associated with the first channel 605) may reach a first final count (e.g., zero) of the first counter. However, instead of winning contention for access to the first channel and transmitting a channel reservation signal over the first channel, the device may defer transmission on the first channel (e.g., defer transmission of the channel reservation signal) and determine whether a resynchronization flag is set. When the resynchronization flag is set, the device may set a current value of the first counter (e.g., zero) to a next lowest current counter value (e.g., two, the value of the third counter). The eCCA procedures being performed for the channels may then continue. When the resynchronization flag is not set, the device may transmit the channel reservation signal on the first channel, and subsequently transmit or receive on just the first channel.

The resynchronization flag may be set to indicate it is more likely that a fewer number of devices (e.g., two devices) are contending for access to the channels of the unlicensed radio frequency spectrum band a greater number of devices (e.g., three or four devices), and thus, the device may be able to win contention for access to multiple channels of the unlicensed radio frequency spectrum band (e.g., to two channels instead of one channel) in parallel and increase transmission or reception bandwidth by attempting to win contention for access to two channels in parallel. For example, when two devices are contending for access to four channels in parallel, fairness and probability dictate that each of the devices should be able to access two of the four channels in parallel.

In some examples, the resynchronization flag may be set during an initialization procedure, presuming that two devices contending for access to the channels of the unlicensed radio frequency spectrum band is more likely than three or four devices contending for access to the unlicensed radio frequency spectrum band. In other examples, the device may compute a fraction of time that the device transmits over a predetermined number of channels (e.g., half of the plurality of channels) of the unlicensed radio frequency spectrum band, in parallel, within an evaluation period (e.g., a 25 millisecond window). When the fraction of time satisfies a threshold, the resynchronization flag may be set. When the fraction of time does not satisfy the threshold, the resynchronization flag may be cleared. In some examples, the threshold may be about 70% (e.g., because when four devices are contending for access to the four channels in parallel, the fraction of time the device wins contention for access to two of the four channels is expected to be about 50%, and when two devices are contending for access to the four channels in parallel, the fraction of time the device wins contention for access to two of the four channels is expected to be near 100%).

In other examples, the resynchronization flag may be set based at least in part on a comparative energy analysis, or a comparative energy analysis may be used instead of a resynchronization flag to determine whether the device should defer transmission on the first channel of the unlicensed radio frequency spectrum band. In accordance with a comparative energy analysis, the device may compare the energies detected on the plurality of channels. When the detected energies are the same, or within a defined range, the device may infer that one other device is contending for access to the plurality of channels. When the detected energies differ (e.g., more than within a defined range), the device may infer that multiple other devices are contending for access to the plurality of channels. In other examples, the resynchronization flag may be set based at least in part on a historical analysis of eCCA success. For example, following access to a single channel during a transmission opportunity, the eCCA success/failure for other channels may be analyzed to determine whether the eCCA procedures for the other channels cleared at the same time. If the eCCA procedures cleared at the same time, it is likely that a total of two devices, versus a total of three or four devices, was contending for access to the unlicensed radio frequency spectrum band in parallel, and the resynchronization flag may be set.

Figure 7:
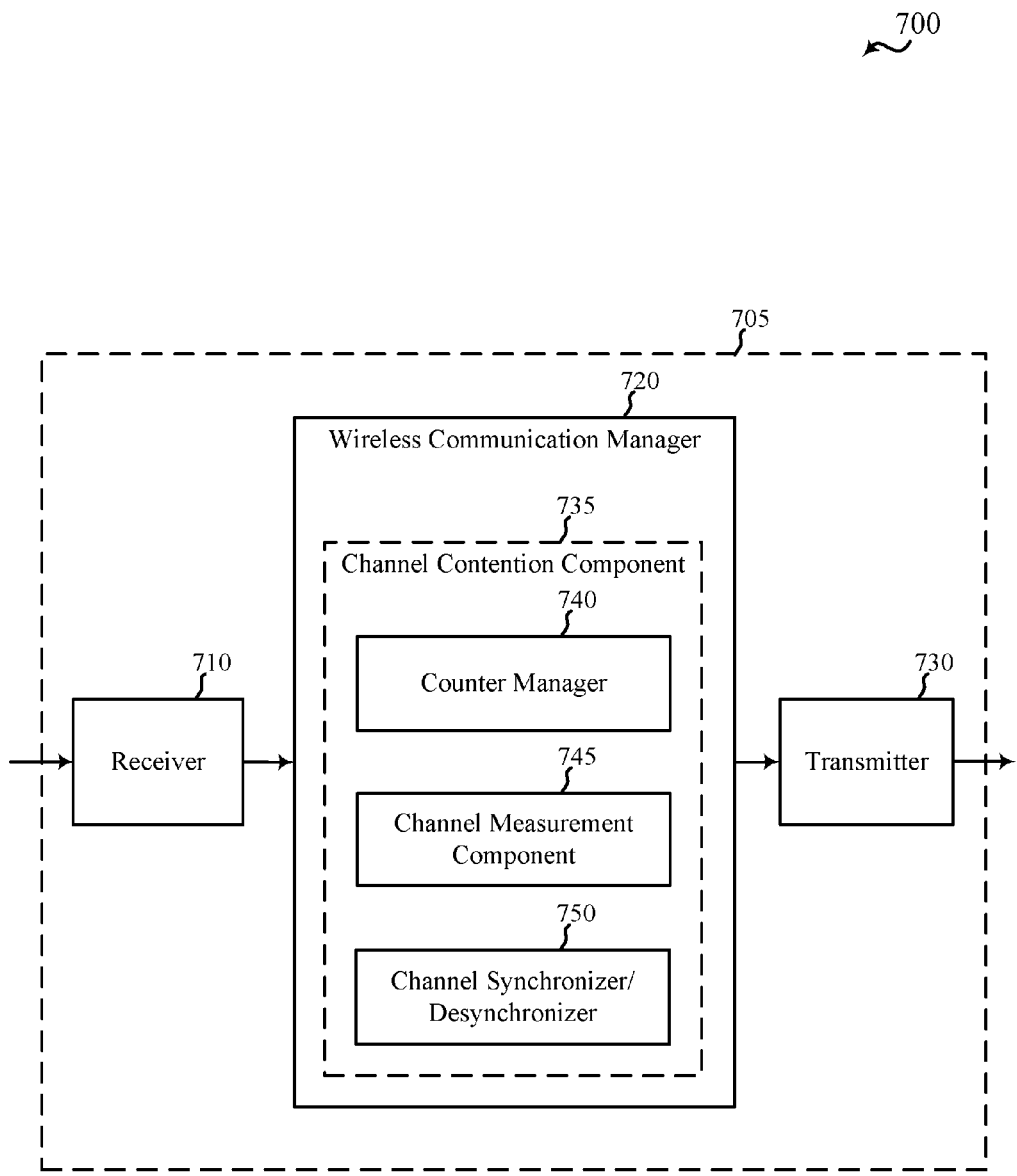
FIG. 7 shows a block diagram of an apparatus for use in wireless communication, in accordance with various aspects of the present disclosure.

FIG. 7 shows a block diagram 700 of an apparatus 705 for use in wireless communication, in accordance with various aspects of the present disclosure. The apparatus 705 may be an example of aspects of one or more of the base stations 105 or UEs 115 described with reference to FIG. 1. The apparatus 705 may also be or include a processor. The apparatus 705 may include a receiver 710, a wireless communication manager 720, or a transmitter 730. Each of these components may be in communication with each other.

The components of the apparatus 705 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), a System-on-Chip (SoC), and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 710 may include at least one radio frequency (RF) receiver, such as at least one RF receiver operable to receive transmissions over a licensed radio frequency spectrum band (e.g., a radio frequency spectrum band for which transmitting apparatuses may not contend for access because the radio frequency spectrum band is licensed to one or more users for one or more uses) or an unlicensed radio frequency spectrum band (e.g., a radio frequency spectrum band for which transmitting apparatuses may contend for access (e.g., a radio frequency spectrum band that is available for Wi-Fi use, or a radio frequency spectrum band that is available for use by multiple operators in an equally shared or prioritized manner)). In some examples, the licensed radio frequency spectrum band or the unlicensed radio frequency spectrum band may be used for LTE/LTE-A communications, as described, for example, with reference to FIG. 1, 2, 3, 4, 5, or 6. The receiver 710 may be used to receive various types of data or control signals (i.e., transmissions) over one or more communication links of a wireless communication system, such as one or more communication links of the wireless communication system 100 described with reference to FIG. 1. The communication links may be established over the first radio frequency spectrum band or the second radio frequency spectrum band.

In some examples, the transmitter 730 may include at least one RF transmitter, such as at least one RF transmitter operable to transmit over the licensed radio frequency spectrum band or the unlicensed radio frequency spectrum band. The transmitter 730 may be used to transmit various types of data or control signals (i.e., transmissions) over one or more communication links of a wireless communication system, such as one or more communication links of the wireless communication system 100 described with reference to FIG. 1. The communication links may be established over the licensed radio frequency spectrum band or the unlicensed radio frequency spectrum band.

In some examples, the wireless communication manager 720 may be used to manage one or more aspects of wireless communication for the apparatus 705. In some examples, the wireless communication manager 720 may include a channel contention component 735. The channel contention component 735 may be used to contend for access to one or more of a plurality of channels of the radio frequency spectrum band. In some examples, the channel contention component 735 may contend for access to two or more of the plurality of channels (e.g., a first channel and a second channel) in parallel. Upon winning contention for access to the two or more channels, the apparatus 705 may transmit or receive on the two or more channels in parallel, thus increasing throughput. In some examples, contending for access to a channel may include performing a plurality of CCA procedures included in an eCCA procedure configured for the channel, and decrementing a counter associated with the channel each time the channel is determined to be clear during a CCA procedure. Contention for access to the channel may then be won upon the counter associated with the channel reaching a final count. In other examples, contending for access to a channel may include performing a single CCA procedure during a single CCA slot. In some examples, the channel contention component 735 may include a counter manager 740, a channel measurement component 745, or a channel synchronizer/desynchronizer 750.

In some examples, the counter manager 740 may be used to identify a plurality of counters used to contend for access to the plurality of channels of the unlicensed radio frequency spectrum band. Each of the plurality of counters may be associated with a respective channel of the plurality of channels of the unlicensed radio frequency spectrum band.

In some examples, the channel measurement component 745 may be used to measure at least one channel of the plurality of channels of the unlicensed radio frequency spectrum band. The measuring may be associated with contending for access to the at least one channel, and in some examples may be performed as part of contending for access to the at least one channel.

In some examples, the channel synchronizer/desynchronizer 750 may be used to synchronize or desynchronize at least a subset of the plurality of counters managed by the counter manager 740. The synchronizing or desynchronizing may be based at least in part on the measuring performed by the channel measurement component 745. In some examples, the synchronizing or desynchronizing may be based on measurements of at least one channel during a time interval (e.g., a CCA slot or a resynchronization slot). In some examples, all of the plurality of counters may be synchronized or desynchronized.

In some examples of the apparatus 705, the synchronizing or desynchronizing performed by the channel synchronizer/desynchronizer 750 may include desynchronizing at least a first counter associated with contention for access to a first channel and a second counter associated with contention for access to a second channel when the measuring performed by the channel measurement component 745 indicates a channel energy above a first energy threshold on at least one of the first channel and the second channel. In other examples of the apparatus 705, the synchronizing or desynchronizing performed by the channel synchronizer/desynchronizer 750 may include synchronizing at least the first counter and the second counter when the measuring performed by the channel measurement component 745 indicates a channel energy below a second energy threshold on at least one of the first channel and the second channel. The first energy threshold and the second energy threshold may be a same energy threshold or different energy thresholds.

Figure 8:
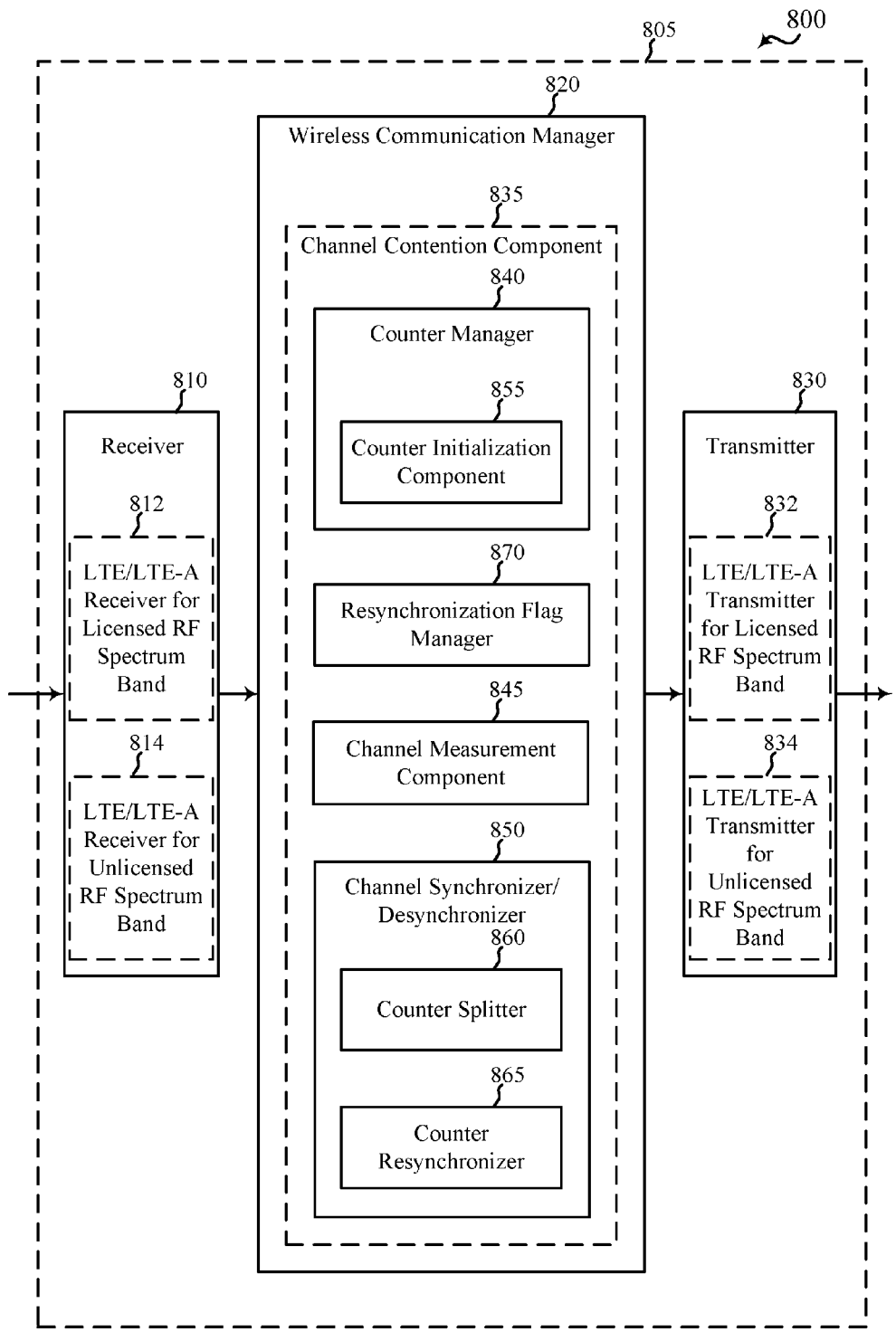
FIG. 8 shows a block diagram of an apparatus for use in wireless communication, in accordance with various aspects of the present disclosure.

FIG. 8 shows a block diagram 800 of an apparatus 805 for use in wireless communication, in accordance with various aspects of the present disclosure. The apparatus 805 may be an example of aspects of one or more of the base stations 105 or UEs 115 described with reference to FIG. 1, or aspects of the apparatus 705 described with reference to FIG. 7. The apparatus 805 may also be or include a processor. The apparatus 805 may include a receiver 810, a wireless communication manager 820, or a transmitter 830. Each of these components may be in communication with each other.

The components of the apparatus 805 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 810 may include at least one RF receiver, such as at least one RF receiver operable to receive transmissions over a licensed radio frequency spectrum band (e.g., a radio frequency spectrum band for which transmitting apparatuses may not contend for access because the radio frequency spectrum band is licensed to particular users for particular uses) or an unlicensed radio frequency spectrum band (e.g., a radio frequency spectrum band for which transmitting apparatuses may contend for access (e.g., a radio frequency spectrum band that is available for Wi-Fi use, or a radio frequency spectrum band that is available for use by multiple operators in an equally shared or prioritized manner)). In some examples, the licensed radio frequency spectrum band or the unlicensed radio frequency spectrum band may be used for LTE/LTE-A communications, as described, for example, with reference to FIG. 1, 2, 3, 4, 5, or 6. The receiver 810 may in some cases include separate receivers for the licensed radio frequency spectrum band and the unlicensed radio frequency spectrum band. The separate receivers may, in some examples, take the form of an LTE/LTE-A receiver for communicating over the licensed radio frequency spectrum band (e.g., LTE/LTE-A receiver for licensed RF spectrum band 812), and an LTE/LTE-A receiver for communicating over the unlicensed radio frequency spectrum band (e.g., LTE/LTE-A receiver for unlicensed RF spectrum band 814). The receiver 810, including the LTE/LTE-A receiver for licensed RF spectrum band 812 or the LTE/LTE-A receiver for unlicensed RF spectrum band 814, may be used to receive various types of data or control signals (i.e., transmissions) over one or more communication links of a wireless communication system, such as one or more communication links of the wireless communication system 100 described with reference to FIG. 1. The communication links may be established over the licensed radio frequency spectrum band or the unlicensed radio frequency spectrum band.

In some examples, the transmitter 830 may include at least one RF transmitter, such as at least one RF transmitter operable to transmit over the licensed radio frequency spectrum band or the unlicensed radio frequency spectrum band. The transmitter 830 may in some cases include separate transmitters for the licensed radio frequency spectrum band and the unlicensed radio frequency spectrum band. The separate transmitters may, in some examples, take the form of an LTE/LTE-A transmitter for communicating over the licensed radio frequency spectrum band (e.g., LTE/LTE-A transmitter for licensed RF spectrum band 832), and an LTE/LTE-A transmitter for communicating over the unlicensed radio frequency spectrum band (e.g., LTE/LTE-A transmitter for unlicensed RF spectrum band 834). The transmitter 830, including the LTE/LTE-A transmitter for licensed RF spectrum band 832 or the LTE/LTE-A transmitter for unlicensed RF spectrum band 834, may be used to transmit various types of data or control signals (i.e., transmissions) over one or more communication links of a wireless communication system, such as one or more communication links of the wireless communication system 100 described with reference to FIG. 1. The communication links may be established over the licensed radio frequency spectrum band or the unlicensed radio frequency spectrum band.

In some examples, the wireless communication manager 820 may be used to manage one or more aspects of wireless communication for the apparatus 805. In some examples, the wireless communication manager 820 may include a channel contention component 835. The channel contention component 835 may be used to contend for access to one or more of a plurality of channels of the radio frequency spectrum band. In some examples, the channel contention component 835 may contend for access to two or more of the plurality of channels (e.g., a first channel and a second channel) in parallel. Upon winning contention for access to the two or more channels, the apparatus 805 may transmit or receive on the two or more channels in parallel, thus increasing throughput. In some examples, contending for access to a channel may include performing a plurality of CCA procedures included in an eCCA procedure configured for the channel, and decrementing a counter associated with the channel each time the channel is determined to be clear during a CCA procedure. Contention for access to the channel may then be won upon the counter associated with the channel reaching a final count. In other examples, contending for access to a channel may include performing a single CCA procedure during a single CCA slot. In some examples, the channel contention component 835 may include a counter manager 840, a resynchronization flag manager 870, a channel measurement component 845, or a channel synchronizer/desynchronizer 850.

In some examples, the counter manager 840 may be used to identify a plurality of counters used to contend for access to the plurality of channels of the unlicensed radio frequency spectrum band. Each of the plurality of counters may be associated with a respective channel of the plurality of channels of the unlicensed radio frequency spectrum band. In some examples, the counter manager may include a counter initialization component 855. The counter initialization component 855 may be used to initialize the plurality of counters under various conditions. During initialization, each of the plurality of counters may be initialized to a same value or different values (e.g., different random values).

In some examples, the resynchronization flag manager 870 may be used to manage the setting or clearing of a resynchronization flag. Setting of the resynchronization flag may, under some conditions, cause the channel synchronizer/desynchronizer 850 to resynchronize two or more counters of the plurality of counters. In some examples, the resynchronization flag manager 870 may set the resynchronization flag during an initialization procedure. In other examples, the resynchronization flag manager 870 may compute a fraction of time that apparatus 805 transmits over a predetermined number of channels (e.g., half of the plurality of channels) of the unlicensed radio frequency spectrum band in parallel. The fraction of time may be computed for an evaluation period. When the fraction of time satisfies a threshold, the resynchronization flag may be set. When the fraction of time does not satisfy the threshold, the resynchronization flag may be cleared.

In some examples, the channel measurement component 845 may be used to measure at least one channel of the plurality of channels of the unlicensed radio frequency spectrum band. The measuring may be associated with contending for access to the at least one channel, and in some examples may be performed as part of contending for access to the at least one channel.

In some examples, the channel synchronizer/desynchronizer 850 may be used to synchronize or desynchronize at least a subset of the plurality of counters managed by the counter manager 840. The synchronizing or desynchronizing may be based at least in part on the measuring performed by the channel measurement component 845. In some examples, the synchronizing or desynchronizing may be based on measurements of at least one channel during a time interval (e.g., a CCA slot or a resynchronization slot). In some examples, all of the plurality of counters may be synchronized or desynchronized. In some examples, the channel synchronizer/desynchronizer 850 may include a counter splitter 860 or a counter resynchronizer 865.

The counter splitter 860 may be used to determine whether measurements obtained for the plurality of channels by the channel measurement component 845, during a time interval (e.g., a CCA slot), indicate a channel energy above a first energy threshold on each of the plurality of channels. When the measuring indicates a channel energy above the first energy threshold on each of the plurality of channels, the counter splitter 860 may be used to split the plurality of counters into a first group of counters and a second group of counters. In some examples, the counters of one group of counters (e.g., the first group of counters) may retain their current values following the splitting, and the counters of the other group of counters (e.g., the second group of counters) may be adjusted (e.g., increased or decreased) to a new value.

The counter resynchronizer 865 may be used to determine whether measurements obtained for the plurality of channels by the channel measurement component 845, during a time interval (e.g., a resynchronization slot), indicate a channel energy below a second energy threshold on at least the first channel and the second channel. When the measuring indicates a channel energy below the second energy threshold on at least the first channel and the second channel, the counter resynchronizer 865 may be used to synchronize at least a first counter associated with contention for access to the first channel and a second counter associated with contention for access to the second channel. In some examples, the first counter and the second counter may be synchronized to a maximum of a first current value of the first counter and a second current value of the second counter. The second energy threshold to which the counter resynchronizer 865 compares channel energies may be the same as, or different from, the first energy threshold to which the counter splitter 860 compares channel energies.

The counter resynchronizer 865 may also be used to determine whether the first counter reaches a first final count of the first counter before the second counter reaches a second final count of the second counter. When the first counter reaches the first final count before the second counter reaches the second final count, the counter resynchronizer 865 may determine whether the resynchronization flag is set. If the resynchronization flag is set, the counter resynchronizer 865 may set a first current value of the first counter to a second current value of the second counter, and deferring transmission on the first channel. For example, if the first current value is zero and the second current value is two, the first current value may be set to two. After setting the first current value of the first counter to the second current value of the second counter, contention for access to at least the first channel and the second channel may continue. When the first counter reaches the first final count before the second counter reaches the second final count, and the counter resynchronizer 865 determines that the resynchronization flag is not set, the counter resynchronizer 865 may allow the channel contention component 835 to indicate a winning of contention for access to the first channel but not the second channel.

Figure 9:
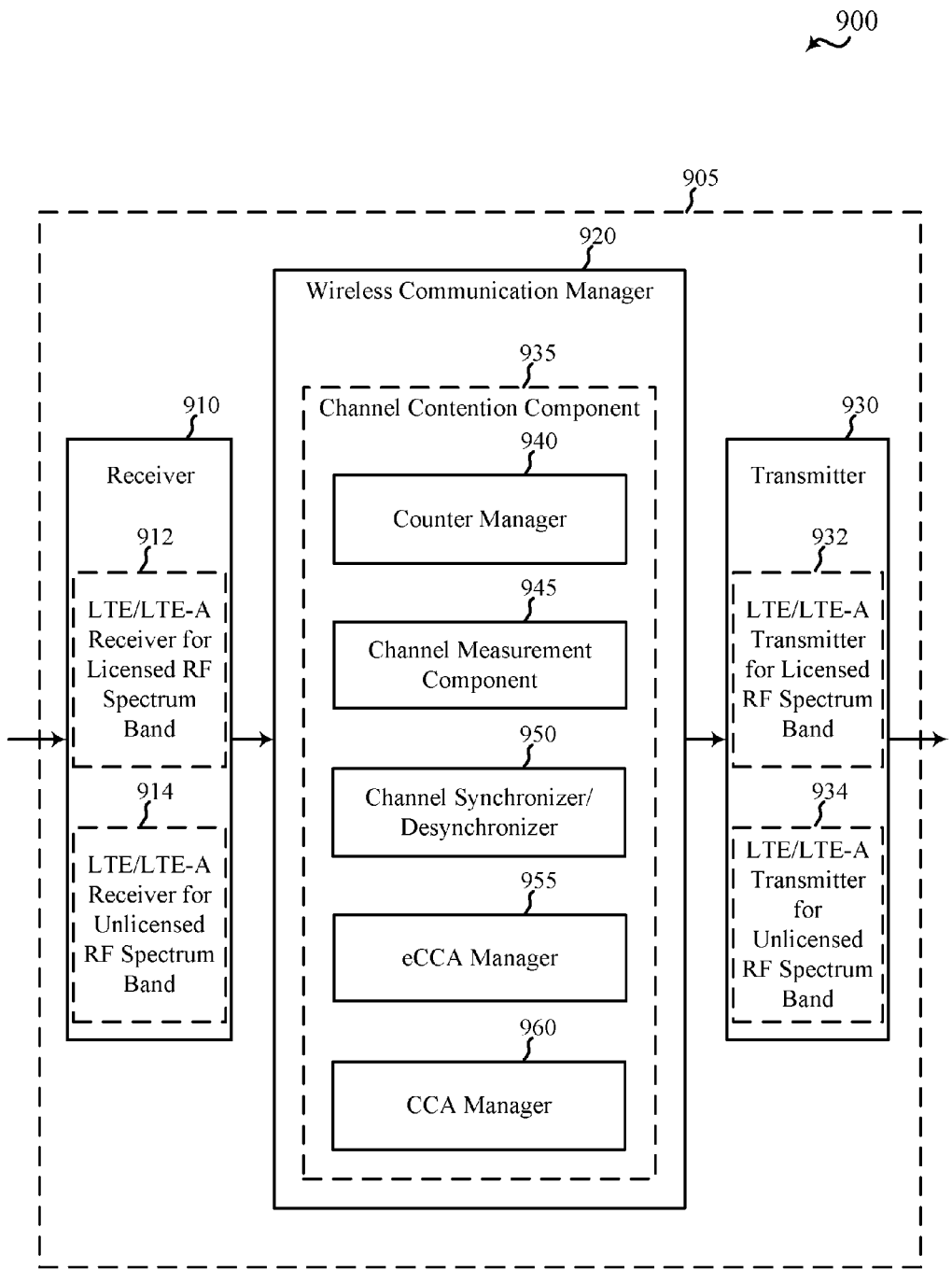
FIG. 9 shows a block diagram of an apparatus for use in wireless communication, in accordance with various aspects of the present disclosure.

FIG. 9 shows a block diagram 900 of an apparatus 905 for use in wireless communication, in accordance with various aspects of the present disclosure. The apparatus 905 may be an example of aspects of one or more of the base stations 105 or UEs 115 described with reference to FIG. 1, or aspects of the apparatus 705 described with reference to FIG. 7. The apparatus 905 may also be or include a processor. The apparatus 905 may include a receiver 910, a wireless communication manager 920, or a transmitter 930. Each of these components may be in communication with each other.

The components of the apparatus 905 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 910 may include at least one RF receiver, such as at least one RF receiver operable to receive transmissions over a licensed radio frequency spectrum band (e.g., a radio frequency spectrum band for which transmitting apparatuses may not contend for access because the radio frequency spectrum band is licensed to particular users for particular uses) or an unlicensed radio frequency spectrum band (e.g., a radio frequency spectrum band for which transmitting apparatuses may contend for access (e.g., a radio frequency spectrum band that is available for Wi-Fi use, or a radio frequency spectrum band that is available for use by multiple operators in an equally shared or prioritized manner)). In some examples, the licensed radio frequency spectrum band or the unlicensed radio frequency spectrum band may be used for LTE/LTE-A communications, as described, for example, with reference to FIG. 1, 2, 3, 4, 5, or 6. The receiver 910 may in some cases include separate receivers for the licensed radio frequency spectrum band and the unlicensed radio frequency spectrum band. The separate receivers may, in some examples, take the form of an LTE/LTE-A receiver for communicating over the licensed radio frequency spectrum band (e.g., LTE/LTE-A receiver for licensed RF spectrum band 912), and an LTE/LTE-A receiver for communicating over the unlicensed radio frequency spectrum band (e.g., LTE/LTE-A receiver for unlicensed RF spectrum band 914). The receiver 910, including the LTE/LTE-A receiver for licensed RF spectrum band 912 or the LTE/LTE-A receiver for unlicensed RF spectrum band 914, may be used to receive various types of data or control signals (i.e., transmissions) over one or more communication links of a wireless communication system, such as one or more communication links of the wireless communication system 100 described with reference to FIG. 1. The communication links may be established over the licensed radio frequency spectrum band or the unlicensed radio frequency spectrum band.

In some examples, the transmitter 930 may include at least one RF transmitter, such as at least one RF transmitter operable to transmit over the licensed radio frequency spectrum band or the unlicensed radio frequency spectrum band. The transmitter 930 may in some cases include separate transmitters for the licensed radio frequency spectrum band and the unlicensed radio frequency spectrum band. The separate transmitters may, in some examples, take the form of an LTE/LTE-A transmitter for communicating over the licensed radio frequency spectrum band (e.g., LTE/LTE-A transmitter for licensed RF spectrum band 932), and an LTE/LTE-A transmitter for communicating over the unlicensed radio frequency spectrum band (e.g., LTE/LTE-A transmitter for unlicensed RF spectrum band 934). The transmitter 930, including the LTE/LTE-A transmitter for licensed RF spectrum band 932 or the LTE/LTE-A transmitter for unlicensed RF spectrum band 934, may be used to transmit various types of data or control signals (i.e., transmissions) over one or more communication links of a wireless communication system, such as one or more communication links of the wireless communication system 100 described with reference to FIG. 1. The communication links may be established over the licensed radio frequency spectrum band or the unlicensed radio frequency spectrum band.

In some examples, the wireless communication manager 920 may be used to manage one or more aspects of wireless communication for the apparatus 905. In some examples, the wireless communication manager 820 may include a channel contention component 935. The channel contention component 935 may be used to contend for access to one or more of a plurality of channels of the radio frequency spectrum band. In some examples, the channel contention component 935 may contend for access to two or more of the plurality of channels (e.g., a first channel and a second channel) in parallel. Upon winning contention for access to the two or more channels, the apparatus 905 may transmit or receive on the two or more channels in parallel, thus increasing throughput. In some examples, contending for access to a channel may include performing a plurality of CCA procedures included in an eCCA procedure configured for the channel, and decrementing a counter associated with the channel each time the channel is determined to be clear during a CCA procedure. Contention for access to the channel may then be won upon the counter associated with the channel reaching a final count. In other examples, contending for access to a channel may include performing a single CCA procedure during a single CCA slot. In some examples, the channel contention component 935 may include a counter manager 940, a channel measurement component 945, a channel synchronizer/desynchronizer 950, an eCCA manager 955, or a CCA manager 960.

In some examples, the counter manager 940 may be used to identify a plurality of counters used to contend for access to the plurality of channels of the unlicensed radio frequency spectrum band. Each of the plurality of counters may be associated with a respective channel of the plurality of channels of the unlicensed radio frequency spectrum band.

In some examples, the channel measurement component 945 may be used to measure at least one channel of the plurality of channels of the unlicensed radio frequency spectrum band. The measuring may be associated with contending for access to the at least one channel, and in some examples may be performed as part of contending for access to the at least one channel.

In some examples, the channel synchronizer/desynchronizer 950 may be used to synchronize or desynchronize at least a subset of the plurality of counters managed by the counter manager 940. The synchronizing or desynchronizing may be based at least in part on the measuring performed by the channel measurement component 945. In some examples, the synchronizing or desynchronizing may be based on measurements of at least one channel during a time interval (e.g., a CCA slot or a resynchronization slot).

In some examples of the apparatus 905, the synchronizing or desynchronizing performed by the channel synchronizer/desynchronizer 950 may include desynchronizing at least a first counter associated with contention for access to a first channel and a second counter associated with contention for access to a second channel. The desynchronizing may be performed, for example, when the measuring performed by the channel measurement component 945 indicates a channel energy above a first energy threshold on at least one of the first channel and the second channel. In some examples, the desynchronizing may be performed by making each of the first channel and the second channel a primary channel, and by contending for access to the first channel and the second channel independently (e.g., by separately managing the first counter and the second counter during separate channel contention procedures for the first channel and the second channel). In other examples of the apparatus 905, the synchronizing or desynchronizing performed by the channel synchronizer/desynchronizer 950 may include synchronizing at least the first counter and the second counter when the measuring performed by the channel measurement component 945 indicates a channel energy below a second energy threshold on at least one of the first channel and the second channel. In some examples, the synchronizing may be performed by making the second channel a secondary channel with respect to the first channel (i.e., with the first channel being a primary channel), and by contending for access to the second channel based at least in part on the success or failure of contending for access to the first channel. The first energy threshold and the second energy threshold may be a same energy threshold or different energy thresholds.

In some examples, the eCCA manager 955 may be used to contend for access to each channel designated a primary channel by the channel synchronizer/desynchronizer 950 (e.g., by performing a separate eCCA procedure for each primary channel). In some examples, performing an eCCA procedure for a primary channel may include measuring an energy on the primary channel during each of a plurality of CCA slots.

In some examples, the CCA manager 960 may be used to contend for access to each secondary channel corresponding to a primary channel for which contention for access is won. Contention for access to a secondary channel is thus dependent on winning contention for access to a corresponding primary channel. Contention for access to a secondary channel may include performing a CCA procedure for the secondary channel.

In some examples, aspects of the apparatus 705, the apparatus 805, and/or the apparatus 905, described with reference to FIGS. 7, 8, and/or 9, may be combined.

Figure 10:
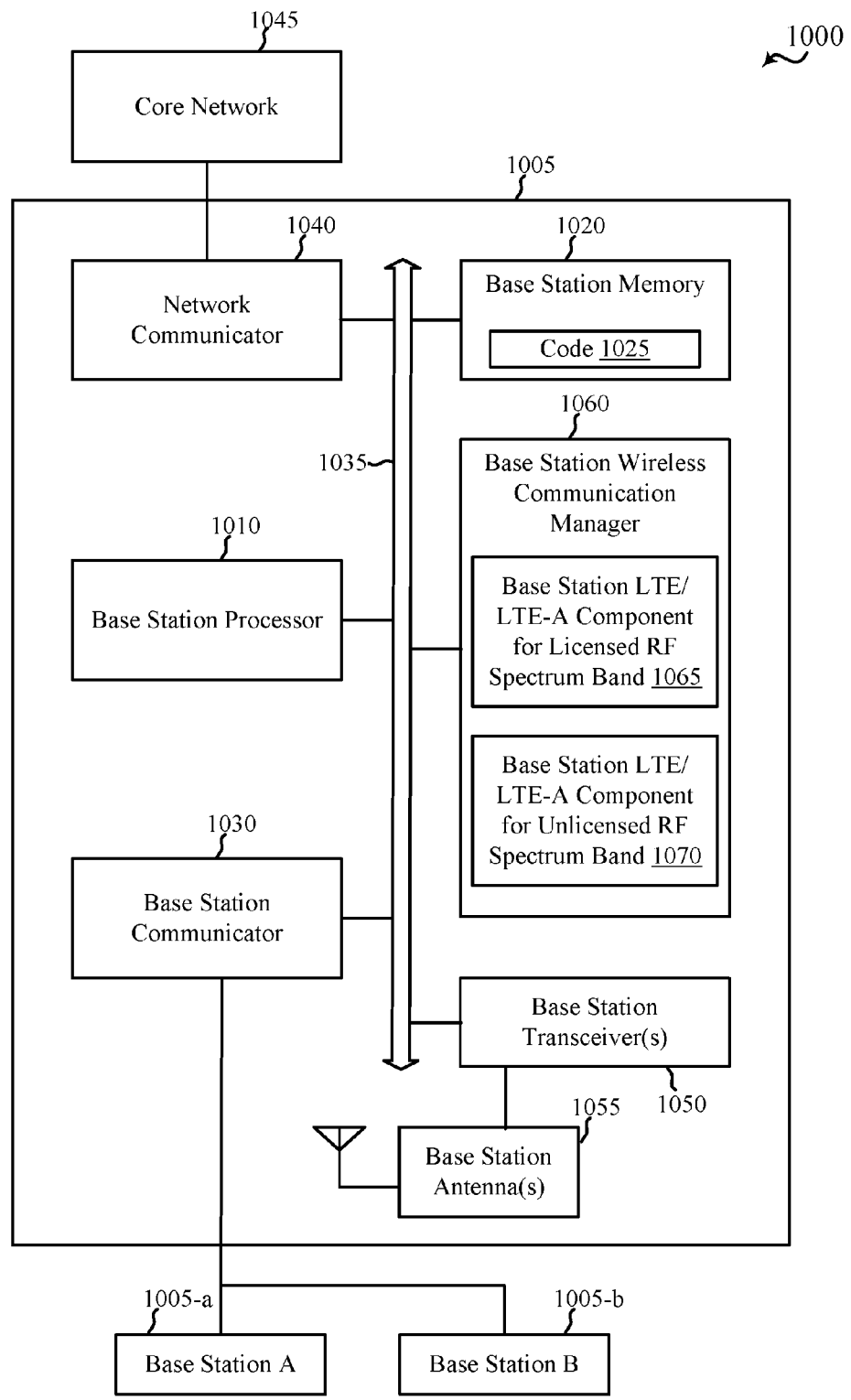
FIG. 10 shows a block diagram of a base station (e.g., a base station forming part or all of an evolved NodeB (eNB)) for use in wireless communication, in accordance with various aspects of the present disclosure.

FIG. 10 shows a block diagram 1000 of a base station 1005 (e.g., a base station forming part or all of an eNB) for use in wireless communication, in accordance with various aspects of the present disclosure. In some examples, the base station 1005 may be an example of one or more aspects of the base stations 105 described with reference to FIG. 1, or aspects of one or more of the apparatus 705, the apparatus 805, or the apparatus 905 described with reference to FIG. 7, 8, or 9. The base station 1005 may be configured to implement or facilitate at least some of the base station techniques and functions described with reference to FIG. 1, 2, 3, 4, 5, 6, 7, 8, or 9.

The base station 1005 may include a base station processor 1010, a base station memory 1020, at least one base station transceiver (represented by base station transceiver(s) 1050), at least one base station antenna (represented by base station antenna(s) 1055), or a base station wireless communication manager 1060. The base station 1005 may also include one or more of a base station communicator 1030 or a network communicator 1040. Each of these components may be in communication with each other, directly or indirectly, over one or more buses 1035.

The base station memory 1020 may include random access memory (RAM) or read-only memory (ROM). The base station memory 1020 may store computer-readable, computer-executable code 1025 containing instructions that are configured to, when executed, cause the base station processor 1010 to perform various functions described herein related to wireless communication, including contending for access to a plurality of channels of an unlicensed radio frequency spectrum band, and synchronizing or desynchronizing counters associated with the plurality of channels, where the plurality of counters are used to contend for access to the plurality of channels. Alternatively, the computer-executable code 1025 may not be directly executable by the base station processor 1010 but be configured to cause the base station 1005 (e.g., when compiled and executed) to perform various of the functions described herein.

The base station processor 1010 may include an intelligent hardware device (e.g., a central processing unit (CPU), a microcontroller, an ASIC, etc.). The base station processor 1010 may process information received through the base station transceiver(s) 1050, the base station communicator 1030, or the network communicator 1040. The base station processor 1010 may also process information to be sent to the transceiver(s) 1050 for transmission through the antenna(s) 1055, to the base station communicator 1030, for transmission to one or more other base stations (e.g., base station 1005-*a* and base station 1005-*b*), or to the network communicator 1040 for transmission to a core network 1045, which may be an example of one or more aspects of the core network 130 described with reference to FIG. 1. The base station processor 1010 may handle, alone or in connection with the base station wireless communication manager 1060, various aspects of communicating over (or managing communications over) a licensed radio frequency spectrum band or an unlicensed radio frequency spectrum band. The licensed radio frequency spectrum band may include a radio frequency spectrum band for which transmitting apparatuses may not contend for access (e.g., a radio frequency spectrum band licensed to particular users for particular uses, such as a licensed radio frequency spectrum band usable for LTE/LTE-A communications). The unlicensed radio frequency spectrum band may include a radio frequency spectrum band for which transmitting apparatuses may contend for access (e.g., a radio frequency spectrum band that is available for Wi-Fi use, or a radio frequency spectrum band that is available for use by multiple operators in an equally shared or prioritized manner).

The base station transceiver(s) 1050 may include a modem configured to modulate packets and provide the modulated packets to the base station antenna(s) 1055 for transmission, and to demodulate packets received from the base station antenna(s) 1055. The base station transceiver(s) 1050 may, in some examples, be implemented as one or more base station transmitters and one or more separate base station receivers. The base station transceiver(s) 1050 may support communications in the licensed radio frequency spectrum band or the unlicensed radio frequency spectrum band. The base station transceiver(s) 1050 may be configured to communicate bi-directionally, via the antenna(s) 1055, with one or more UEs or apparatuses, such as one or more of the UEs 115 described with reference to FIG. 1, or one or more of the apparatus 705, the apparatus 805, or the apparatus 905 described with reference to FIG. 7, 8, or 9. The base station 1005 may, for example, include multiple base station antennas 1055 (e.g., an antenna array). The base station 1005 may communicate with the core network 1045 through the network communicator 1040. The base station 1005 may also communicate with other base stations, such as the base station 1005-*a* and the base station 1005-*b*, using the base station communicator 1030.

The base station wireless communication manager 1060 may be configured to perform or control some or all of the techniques or functions described with reference to FIG. 1, 2, 3, 4, 5, 6, 7, 8, or 9 related to wireless communication over the licensed radio frequency spectrum band or the unlicensed radio frequency spectrum band. For example, the base station wireless communication manager 1060 may be configured to support a supplemental downlink mode (e.g., a licensed assisted access mode), a carrier aggregation mode, or a standalone mode using the licensed radio frequency spectrum band or the unlicensed radio frequency spectrum band. The base station wireless communication manager 1060 may include a base station LTE/LTE-A component for licensed RF spectrum band 1065 configured to handle LTE/LTE-A communications in the licensed radio frequency spectrum band, and a base station LTE/LTE-A component for unlicensed RF spectrum band 1070 configured to handle LTE/LTE-A communications in the unlicensed radio frequency spectrum band. The base station wireless communication manager 1060, or portions of it, may include a processor, or some or all of the functions of the base station wireless communication manager 1060 may be performed by the base station processor 1010 or in connection with the base station processor 1010. In some examples, the base station wireless communication manager 1060 may be an example of the wireless communication manager 720, 820, or 920 described with reference to FIG. 7, 8, or 9.

Figure 11:
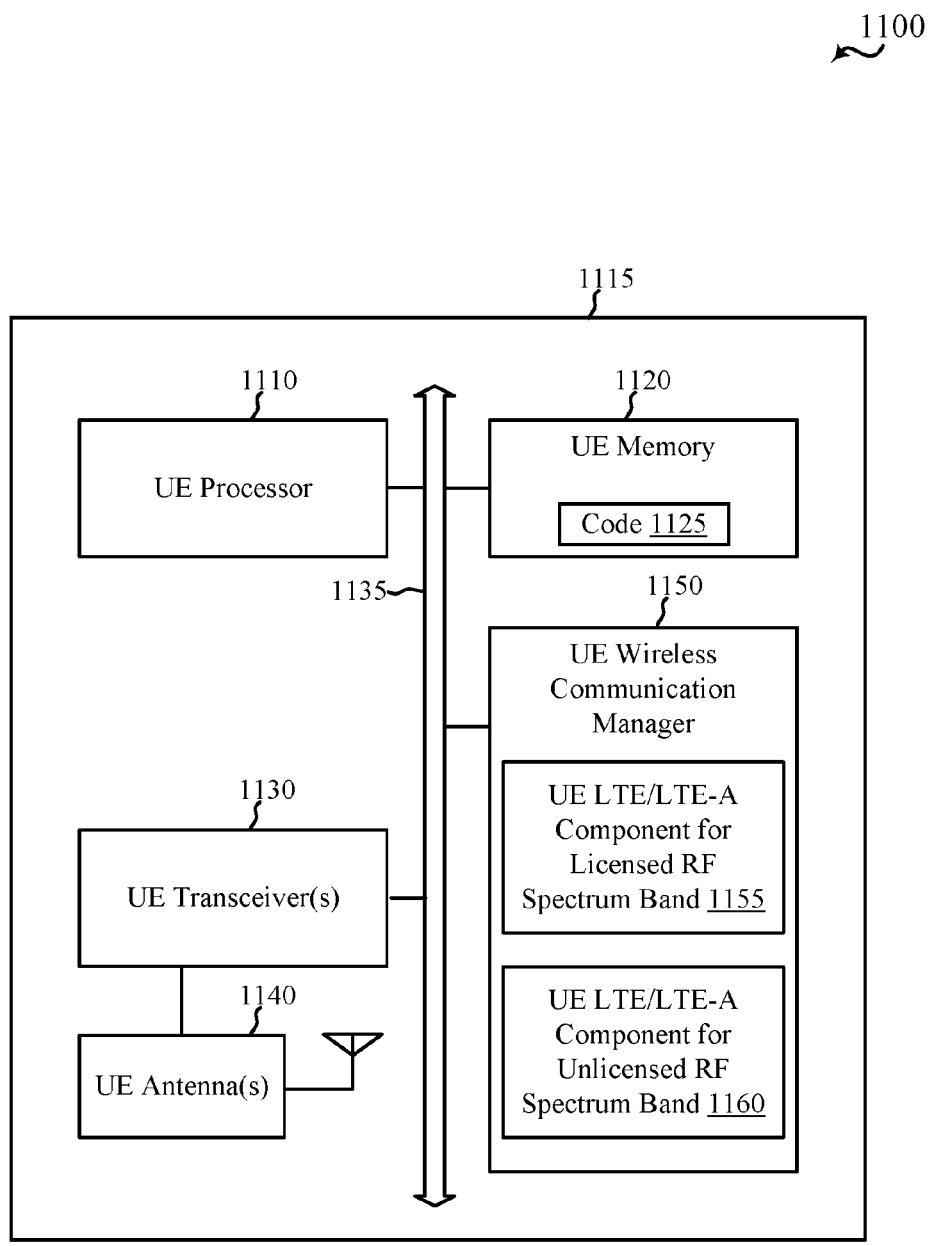
FIG. 11 shows a block diagram of a UE for use in wireless communication, in accordance with various aspects of the present disclosure.

FIG. 11 shows a block diagram 1100 of a UE 1115 for use in wireless communication, in accordance with various aspects of the present disclosure. The UE 1115 may be included or be part of a personal computer (e.g., a laptop computer, a netbook computer, a tablet computer, etc.), a cellular telephone, a PDA, a DVR, an internet appliance, a gaming console, an e-reader, etc. The UE 1115 may, in some examples, have an internal power supply (not shown), such as a small battery, to facilitate mobile operation. In some examples, the UE 1115 may be an example of aspects of one or more of the UEs 115 described with reference to FIG. 1, or aspects of one or more of the apparatus 705, the apparatus 805, or the apparatus 905 described with reference to FIG. 7, 8, or 9. The UE 1115 may be configured to implement at least some of the UE or apparatus techniques and functions described with reference to FIG. 1, 2, 3, 4, 5, 6, 7, 8, or 9.

The UE 1115 may include a UE processor 1110, a UE memory 1120, at least one UE transceiver (represented by UE transceiver(s) 1130), at least one UE antenna (represented by UE antenna(s) 1140), or a UE wireless communication manager 1150. Each of these components may be in communication with each other, directly or indirectly, over one or more buses 1135.

The UE memory 1120 may include RAM or ROM. The UE memory 1120 may store computer-readable, computer-executable code 1125 containing instructions that are configured to, when executed, cause the UE processor 1110 to perform various functions described herein related to wireless communication, including contending for access to a plurality of channels of an unlicensed radio frequency spectrum band, and synchronizing or desynchronizing counters associated with the plurality of channels, where the plurality of counters are used to contend for access to the plurality of channels. Alternatively, the computer-executable code 1125 may not be directly executable by the UE processor 1110 but be configured to cause the UE 1115 (e.g., when compiled and executed) to perform various of the functions described herein.

The UE processor 1110 may include an intelligent hardware device (e.g., a CPU, a microcontroller, an ASIC, etc.). The UE processor 1110 may process information received through the UE transceiver(s) 1130 or information to be sent to the UE transceiver(s) 1130 for transmission through the UE antenna(s) 1140. The UE processor 1110 may handle, alone or in connection with the UE wireless communication manager 1150, various aspects of communicating over (or managing communications over) a licensed radio frequency spectrum band or an unlicensed radio frequency spectrum band. The licensed radio frequency spectrum band may include a radio frequency spectrum band for which transmitting apparatuses may not contend for access (e.g., a radio frequency spectrum band licensed to particular users for particular uses, such as a licensed radio frequency spectrum band usable for LTE/LTE-A communications). The unlicensed radio frequency spectrum band may include a radio frequency spectrum band for which transmitting apparatuses may contend for access (e.g., a radio frequency spectrum band that is available for Wi-Fi use, or a radio frequency spectrum band that is available for use by multiple operators in an equally shared or prioritized manner).

The UE transceiver(s) 1130 may include a modem configured to modulate packets and provide the modulated packets to the UE antenna(s) 1140 for transmission, and to demodulate packets received from the UE antenna(s) 1140. The UE transceiver(s) 1130 may, in some examples, be implemented as one or more UE transmitters and one or more separate UE receivers. The UE transceiver(s) 1130 may support communications in the licensed radio frequency spectrum band or the unlicensed radio frequency spectrum band. The UE transceiver(s) 1130 may be configured to communicate bi-directionally, via the UE antenna(s) 1140, with one or more of the base stations 105 described with reference to FIG. 1, or one or more of the apparatus 705, the apparatus 805, or the apparatus 905 described with reference to FIG. 7, 8, or 9. While the UE 1115 may include a single UE antenna, there may be examples in which the UE 1115 may include multiple UE antennas 1140.

The UE wireless communication manager 1150 may be configured to perform or control some or all of the UE or apparatus techniques or functions described with reference to FIG. 1, 2, 3, 4, 5, 6, 7, 8, or 9 related to wireless communication over the licensed radio frequency spectrum band or the unlicensed radio frequency spectrum band. For example, the UE wireless communication manager 1150 may be configured to support a supplemental downlink mode (e.g., a licensed assisted access mode), a carrier aggregation mode, or a standalone mode using the licensed radio frequency spectrum band or the unlicensed radio frequency spectrum band. The UE wireless communication manager 1150 may include a UE LTE/LTE-A component for licensed RF spectrum band 1155 configured to handle LTE/LTE-A communications in the licensed radio frequency spectrum band, and a UE LTE/LTE-A component for unlicensed RF spectrum band 1160 configured to handle LTE/LTE-A communications in the unlicensed radio frequency spectrum band. The UE wireless communication manager 1150, or portions of it, may include a processor, or some or all of the functions of the UE wireless communication manager 1150 may be performed by the UE processor 1110 or in connection with the UE processor 1110. In some examples, the UE wireless communication manager 1150 may be an example of the wireless communication manager 720, 820, or 920 described with reference to FIG. 7, 8, or 9.

Figure 12:
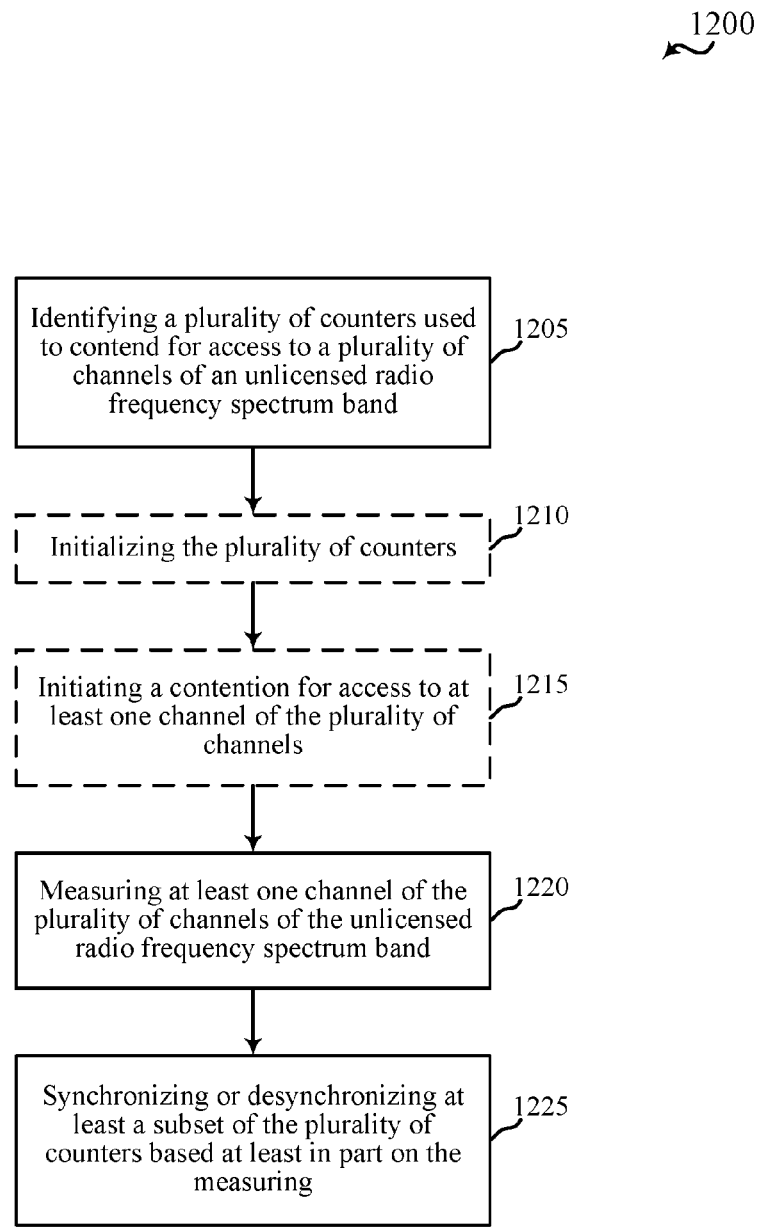
FIG. 12 is a flow chart illustrating an example of a method for wireless communication, in accordance with various aspects of the present disclosure.

FIG. 12 is a flow chart illustrating an example of a method 1200 for wireless communication, in accordance with various aspects of the present disclosure. For clarity, the method 1200 is described below with reference to aspects of one or more of the base stations 105 or 1005 described with reference to FIG. 1 or 10, aspects of one or more of the UEs 115 or 1115 described with reference to FIG. 1 or 11, or aspects of one or more of the apparatus 705, the apparatus 805, or the apparatus 905 described with reference to FIG. 7, 8, or 9. In some examples, a base station, UE, or apparatus may execute one or more sets of codes to control the functional elements of the base station, UE, or apparatus to perform the functions described below. Additionally or alternatively, the base station, UE, or apparatus may perform one or more of the functions described below using special-purpose hardware.

At block 1205, the method 1200 may include identifying a plurality of counters used to contend for access to a plurality of channels of an unlicensed radio frequency spectrum band. Each of the plurality of counters may be associated with a respective channel of the plurality of channels of the unlicensed radio frequency spectrum band. The unlicensed radio frequency spectrum band may include a radio frequency spectrum band for which transmitting apparatuses contend for access (e.g., a radio frequency spectrum band that is available for Wi-Fi use, or a radio frequency spectrum band that is available for use by multiple operators in an equally shared or prioritized manner). The operation(s) at block 1205 may be performed using the wireless communication manager 720, 820, or 920, the base station wireless communication manager 1060, or the UE wireless communication manager 1150 described with reference to FIG. 7, 8, 9, 10, or 11, or the channel contention component 735, 835, or 935 or counter manager 740, 840, or 940 described with reference to FIG. 7, 8, or 9.

At block 1210, the method 1200 may optionally include initializing the plurality of counters. Each of the plurality of counters may be initialized to a same value or different values (e.g., different random values). The operation(s) at block 1210 may be performed using the wireless communication manager 720, 820, or 920, the base station wireless communication manager 1060, or the UE wireless communication manager 1150 described with reference to FIG. 7, 8, 9, 10, or 11, the channel contention component 735, 835, or 935 or counter manager 740, 840, or 940 described with reference to FIG. 7, 8, or 9, or the counter initialization component 855 described with reference to FIG. 8.

At block 1215, the method 1200 may optionally include initiating a contention for access to at least one channel of the plurality of channels. In some examples, contending for access to a channel may include performing a plurality of CCA procedures included in an eCCA procedure configured for the channel, and decrementing a counter associated with the channel each time the channel is determined to be clear during a CCA procedure. Contention for access to the channel may be won upon the counter associated with the channel reaching a final count. The operation(s) at block 1215 may be performed using the wireless communication manager 720, 820, or 920, the base station wireless communication manager 1060, or the UE wireless communication manager 1150 described with reference to FIG. 7, 8, 9, 10, or 11, or the channel contention component 735, 835, or 935 described with reference to FIG. 7, 8, or 9.

At block 1220, the method 1200 may include measuring the at least one channel of the plurality of channels of the unlicensed radio frequency spectrum band. The measuring may be associated with the contention for access to the at least one channel of the unlicensed radio frequency spectrum band, and in some examples may be performed as part of the contention for access. In some examples, the at least one channel may include all of the plurality of channels. The operation(s) at block 1220 may be performed using the wireless communication manager 720, 820, or 920, the base station wireless communication manager 1060, or the UE wireless communication manager 1150 described with reference to FIG. 7, 8, 9, 10, or 11, or the channel contention component 735, 835, or 935 or channel measurement component 745, 845, or 945 described with reference to FIG. 7, 8, or 9.

At block 1225, the method 1200 may include synchronizing or desynchronizing at least a subset of the plurality of counters based at least in part on the measuring performed at block 1220. In some examples, the synchronizing or desynchronizing may be based on measurements of the at least one channel during a time interval (e.g., a CCA slot or a resynchronization slot). In some examples, all of the plurality of counters may be synchronized or desynchronized. The operation(s) at block 1225 may be performed using the wireless communication manager 720, 820, or 920, the base station wireless communication manager 1060, or the UE wireless communication manager 1150 described with reference to FIG. 7, 8, 9, 10, or 11, or the channel contention component 735, 835, or 935 or channel synchronizer/desynchronizer 750, 850, or 950 described with reference to FIG. 7, 8, or 9.

In some examples of the method 1200, the synchronizing or desynchronizing performed at block 1225 may include desynchronizing at least a first counter associated with contention for access to a first channel and a second counter associated with contention for access to a second channel when the measuring, at block 1220, indicates a channel energy above a first energy threshold on at least one of the first channel and the second channel. In other examples of the method 1200, the synchronizing or desynchronizing performed at block 1225 may include synchronizing at least the first counter and the second counter when the measuring, at block 1220, indicates a channel energy below a second energy threshold on at least one of the first channel and the second channel. The first energy threshold and the second energy threshold may be a same energy threshold or different energy thresholds.

Thus, the method 1200 may provide for wireless communication. It should be noted that the method 1200 is just one implementation and that the operations of the method 1200 may be rearranged or otherwise modified such that other implementations are possible.

Figure 13:
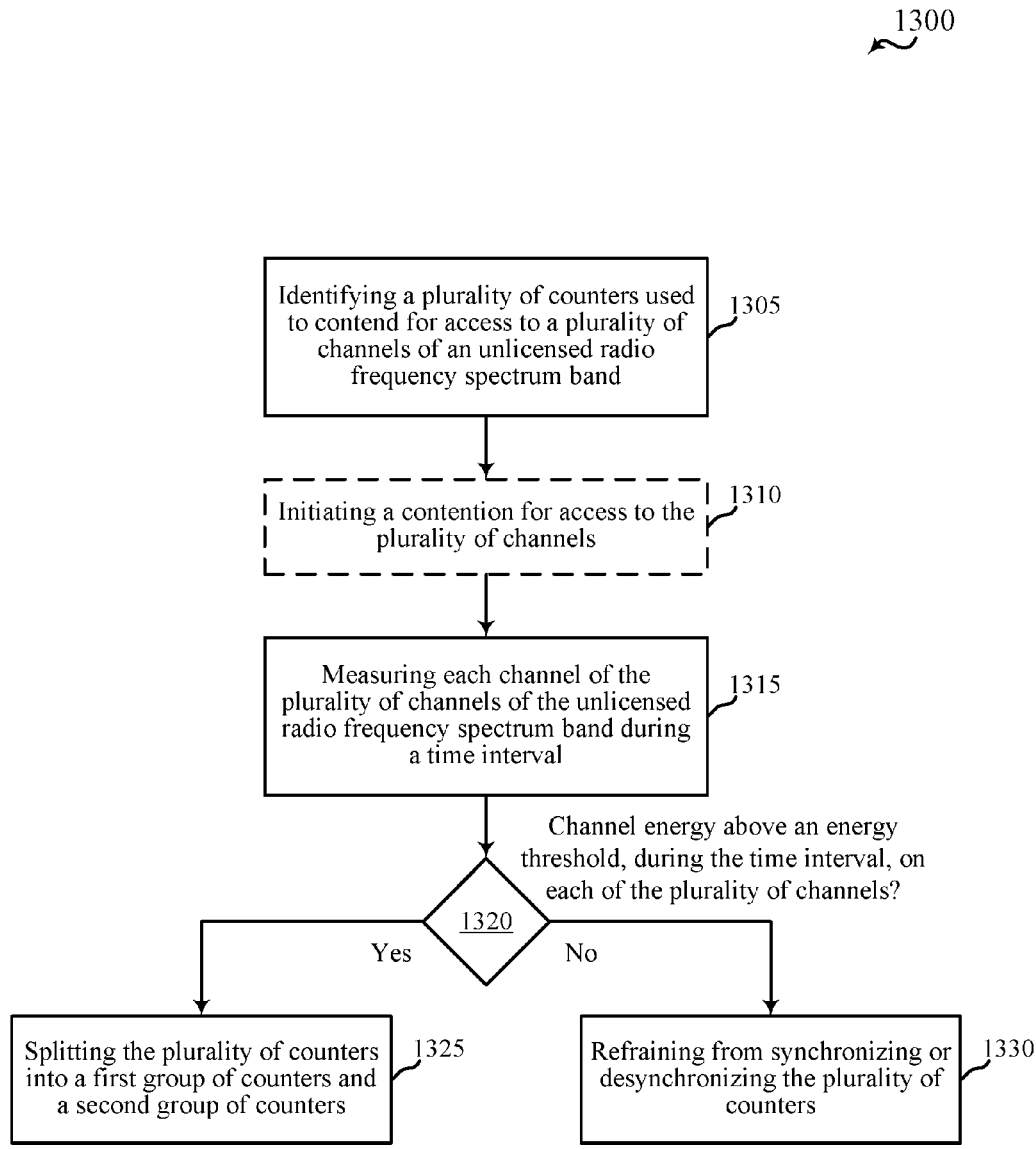
FIG. 13 is a flow chart illustrating an example of a method for wireless communication, in accordance with various aspects of the present disclosure.

FIG. 13 is a flow chart illustrating an example of a method 1300 for wireless communication, in accordance with various aspects of the present disclosure. For clarity, the method 1300 is described below with reference to aspects of one or more of the base stations 105 or 1005 described with reference to FIG. 1 or 10, aspects of one or more of the UEs 115 or 1115 described with reference to FIG. 1 or 11, or aspects of one or more of the apparatus 705 or the apparatus 805 described with reference to FIG. 7 or 8. In some examples, a base station, UE, or apparatus may execute one or more sets of codes to control the functional elements of the base station, UE, or apparatus to perform the functions described below. Additionally or alternatively, the base station, UE, or apparatus may perform one or more of the functions described below using special-purpose hardware.

At block 1305, the method 1300 may include identifying a plurality of counters used to contend for access to a plurality of channels of an unlicensed radio frequency spectrum band. Each of the plurality of counters may be associated with a respective channel of the plurality of channels of the unlicensed radio frequency spectrum band. The unlicensed radio frequency spectrum band may include a radio frequency spectrum band for which transmitting apparatuses contend for access (e.g., a radio frequency spectrum band that is available for Wi-Fi use, or a radio frequency spectrum band that is available for use by multiple operators in an equally shared or prioritized manner). The operation(s) at block 1305 may be performed using the wireless communication manager 720 or 820, the base station wireless communication manager 1060, or the UE wireless communication manager 1150 described with reference to FIG. 7, 8, 10, or 11, or the channel contention component 735, 835, or 935 or counter manager 740 or 840 described with reference to FIG. 7 or 8.

At block 1310, the method 1300 may optionally include initiating a contention for access to the plurality of channels. In some examples, contending for access to a channel may include performing a plurality of CCA procedures included in an eCCA procedure configured for the channel, and decrementing a counter associated with the channel each time the channel is determined to be clear during a CCA procedure. Contention for access to the channel may be won upon the counter associated with the channel reaching a final count. The operation(s) at block 1310 may be performed using the wireless communication manager 720 or 820, the base station wireless communication manager 1060, or the UE wireless communication manager 1150 described with reference to FIG. 7, 8, 10, or 11, or the channel contention component 735 or 835 described with reference to FIG. 7 or 8.

At block 1315, the method 1300 may include measuring each channel of the plurality of channels of the unlicensed radio frequency spectrum band during a time interval (e.g., a CCA slot). The measuring may be associated with the contention for access to the plurality of channels of the unlicensed radio frequency spectrum band, and in some examples may be performed as part of the contention for access. The operation(s) at block 1315 may be performed using the wireless communication manager 720 or 820, the base station wireless communication manager 1060, or the UE wireless communication manager 1150 described with reference to FIG. 7, 8, 9, 10, or 11, or the channel contention component 735 or 835 or channel measurement component 745 or 845 described with reference to FIG. 7 or 8.

At block 1320, the method 1300 may include determining whether the measuring, during the time interval, indicates a channel energy above an energy threshold on each of the plurality of channels. When the measuring indicates a channel energy above the energy threshold on each of the plurality of channels, the method 1300 may continue at block 1325. When the measuring does not indicate a channel energy above the energy threshold on each of the plurality of channels, the method 1300 may continue at block 1330. The operation(s) at block 1320 may be performed using the wireless communication manager 720 or 820, the base station wireless communication manager 1060, or the UE wireless communication manager 1150 described with reference to FIG. 7, 8, 10, or 11, the channel contention component 735 or 835 or channel synchronizer/desynchronizer 750 or 850 described with reference to FIG. 7 or 8, or the counter splitter 860 described with reference to FIG. 8.

At block 1325, the method 1300 may include splitting the plurality of counters into a first group of counters and a second group of counters. The splitting is an example of the desynchronizing described with reference to block 1220 of FIG. 12 In some examples, the counters of one group of counters (e.g., the first group of counters) may retain their current values following the splitting, and the counters of the other group of counters (e.g., the second group of counters) may be adjusted (e.g., increased or decreased) to a new value. The operation(s) at block 1325 may be performed using the wireless communication manager 720 or 820, the base station wireless communication manager 1060, or the UE wireless communication manager 1150 described with reference to FIG. 7, 8, 10, or 11, the channel contention component 735 or 835 or channel synchronizer/desynchronizer 750 or 850 described with reference to FIG. 7 or 8, or the counter splitter 860 described with reference to FIG. 8.

At block 1330, the method 1300 may include refraining from synchronizing or desynchronizing the plurality of counters. The operation(s) at block 1330 may be performed using the wireless communication manager 720 or 820, the base station wireless communication manager 1060, or the UE wireless communication manager 1150 described with reference to FIG. 7, 8, 10, or 11, the channel contention component 735 or 835 or channel synchronizer/desynchronizer 750 or 850 described with reference to FIG. 7 or 8, or the counter splitter 860 described with reference to FIG. 8.

Thus, the method 1300 may provide for wireless communication. It should be noted that the method 1300 is just one implementation and that the operations of the method 1300 may be rearranged or otherwise modified such that other implementations are possible.

Figure 14:
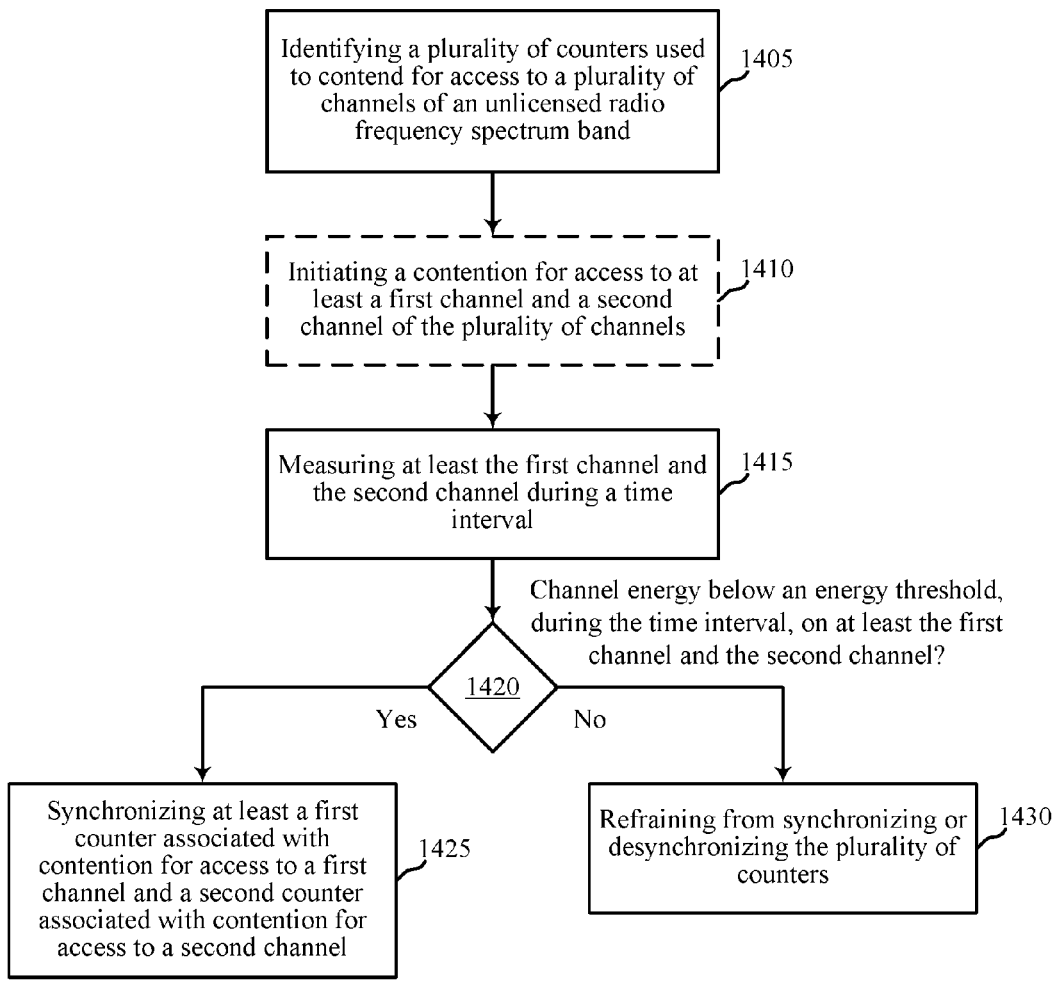
FIG. 14 is a flow chart illustrating an example of a method for wireless communication, in accordance with various aspects of the present disclosure.

FIG. 14 is a flow chart illustrating an example of a method 1400 for wireless communication, in accordance with various aspects of the present disclosure. For clarity, the method 1400 is described below with reference to aspects of one or more of the base stations 105 or 1005 described with reference to FIG. 1 or 10, aspects of one or more of the UEs 115 or 1115 described with reference to FIG. 1 or 11, or aspects of one or more of the apparatus 705 or the apparatus 805 described with reference to FIG. 7 or 8. In some examples, a base station, UE, or apparatus may execute one or more sets of codes to control the functional elements of the base station, UE, or apparatus to perform the functions described below. Additionally or alternatively, the base station, UE, or apparatus may perform one or more of the functions described below using special-purpose hardware.

At block 1405, the method 1400 may include identifying a plurality of counters used to contend for access to a plurality of channels of an unlicensed radio frequency spectrum band. Each of the plurality of counters may be associated with a respective channel of the plurality of channels of the unlicensed radio frequency spectrum band. The unlicensed radio frequency spectrum band may include a radio frequency spectrum band for which transmitting apparatuses contend for access (e.g., a radio frequency spectrum band that is available for Wi-Fi use, or a radio frequency spectrum band that is available for use by multiple operators in an equally shared or prioritized manner). The operation(s) at block 1405 may be performed using the wireless communication manager 720 or 820, the base station wireless communication manager 1060, or the UE wireless communication manager 1150 described with reference to FIG. 7, 8, 10, or 11, or the channel contention component 735 or 835 or counter manager 740 or 840 described with reference to FIG. 7 or 8.

At block 1410, the method 1400 may optionally include initiating a contention for access to at least a first channel and a second channel of the plurality of channels. In some examples, contending for access to a channel may include performing a plurality of CCA procedures included in an eCCA procedure configured for the channel, and decrementing a counter associated with the channel each time the channel is determined to be clear during a CCA procedure. Contention for access to the channel may be won upon the counter associated with the channel reaching a final count. The operation(s) at block 1410 may be performed using the wireless communication manager 720 or 820, the base station wireless communication manager 1060, or the UE wireless communication manager 1150 described with reference to FIG. 7, 8, 10, or 11, or the channel contention component 735 or 835 described with reference to FIG. 7 or 8.

At block 1415, the method 1400 may include measuring at least the first channel and the second channel during a time interval (e.g., a resynchronization slot). The measuring may be associated with the contention for access to at least the first channel and the second channel, and in some examples may be performed as part of the contention for access. The operation(s) at block 1415 may be performed using the wireless communication manager 720 or 820, the base station wireless communication manager 1060, or the UE wireless communication manager 1150 described with reference to FIG. 7, 8, 10, or 11, or the channel contention component 735 or 835 or channel measurement component 745 or 845 described with reference to FIG. 7 or 8.

At block 1420, the method 1400 may include determining whether the measuring, during the time interval, indicates a channel energy below an energy threshold on at least the first channel and the second channel. When the measuring indicates a channel energy below the energy threshold on at least the first channel and the second channel, the method 1400 may continue at block 1425. When the measuring does not indicate a channel energy below the energy threshold on at least the first channel and the second channel, the method 1400 may continue at block 1430. The operation(s) at block 1420 may be performed using the wireless communication manager 720 or 820, the base station wireless communication manager 1060, or the UE wireless communication manager 1150 described with reference to FIG. 7, 8, 10, or 11, the channel contention component 735 or 835 or channel synchronizer/desynchronizer 750 or 850 described with reference to FIG. 7 or 8, or the counter resynchronizer 865 described with reference to FIG. 8.

At block 1425, the method 1400 may include synchronizing at least a first counter associated with contention for access to the first channel and a second counter associated with contention for access to the second channel. In some examples, the first counter and the second counter may be synchronized to a maximum of a first current value of the first counter and a second current value of the second counter. The synchronizing is an example of the synchronizing described with reference to block 1220 of FIG. 12. The operation(s) at block 1425 may be performed using the wireless communication manager 720 or 820, the base station wireless communication manager 1060, or the UE wireless communication manager 1150 described with reference to FIG. 7, 8, 10, or 11, the channel contention component 735 or 835 or channel synchronizer/desynchronizer 750 or 850 described with reference to FIG. 7 or 8, or the counter resynchronizer 865 described with reference to FIG. 8.

At block 1430, the method 1400 may include refraining from synchronizing or desynchronizing the plurality of counters. The operation(s) at block 1430 may be performed using the wireless communication manager 720 or 820, the base station wireless communication manager 1060, or the UE wireless communication manager 1150 described with reference to FIG. 7, 8, 10, or 11, the channel contention component 735 or 835 or channel synchronizer/desynchronizer 750 or 850 described with reference to FIG. 7 or 8, or the counter resynchronizer 865 described with reference to FIG. 8.

Thus, the method 1400 may provide for wireless communication. It should be noted that the method 1400 is just one implementation and that the operations of the method 1400 may be rearranged or otherwise modified such that other implementations are possible.

Figure 15:
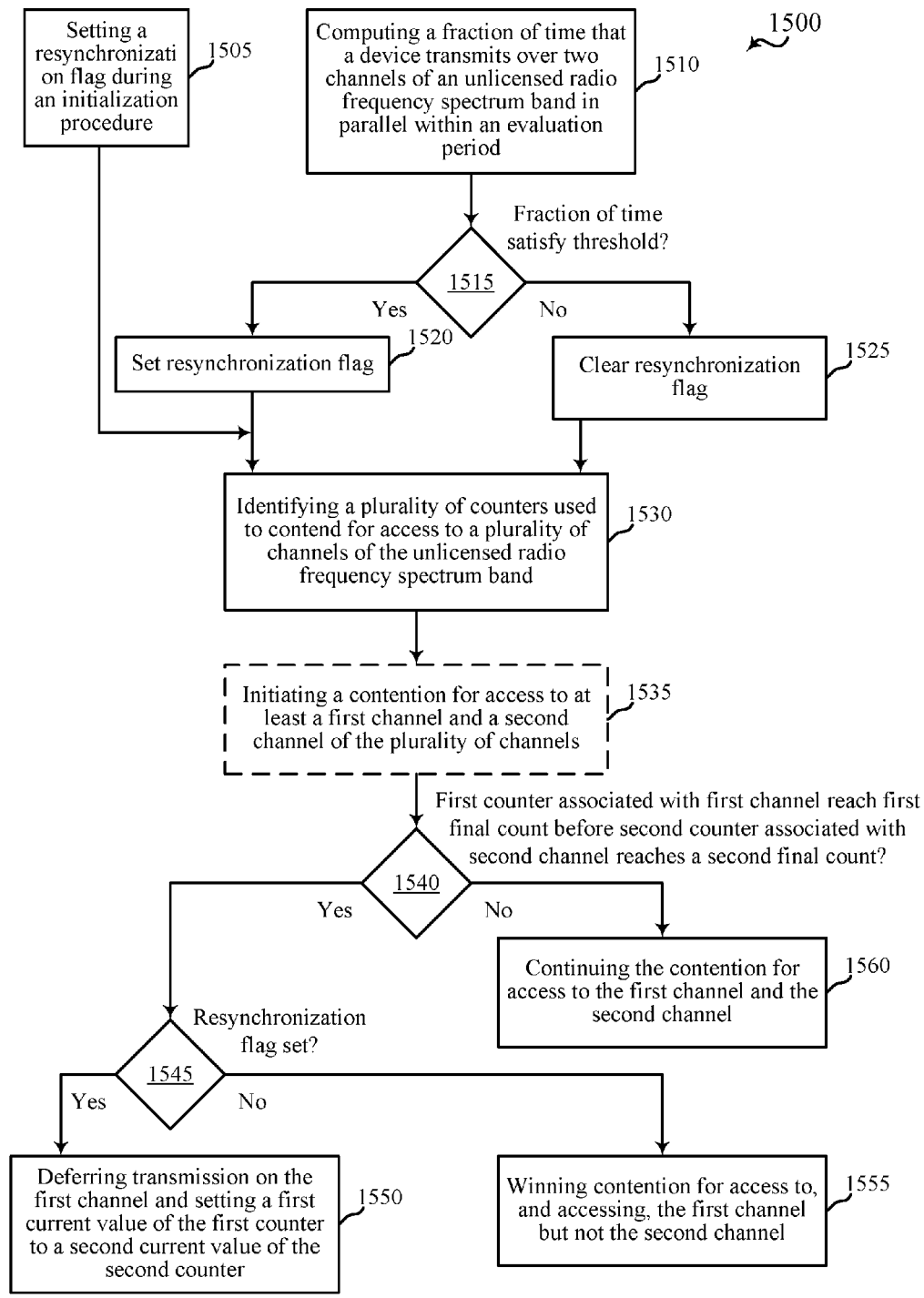
FIG. 15 is a flow chart illustrating an example of a method for wireless communication, in accordance with various aspects of the present disclosure.

FIG. 15 is a flow chart illustrating an example of a method 1500 for wireless communication, in accordance with various aspects of the present disclosure. For clarity, the method 1500 is described below with reference to aspects of one or more of the base stations 105 or 1005 described with reference to FIG. 1 or 10, aspects of one or more of the UEs 115 or 1115 described with reference to FIG. 1 or 11, or aspects of one or more of the apparatus 705 or the apparatus 805 described with reference to FIG. 7 or 8. In some examples, a base station, UE, or apparatus may execute one or more sets of codes to control the functional elements of the base station, UE, or apparatus to perform the functions described below. Additionally or alternatively, the base station, UE, or apparatus may perform one or more of the functions described below using special-purpose hardware.

At block 1505, block 1520, and/or block 1525, the method 1500 may include setting or clearing a resynchronization flag. At block 1505, the method 1500 may include setting the resynchronization flag during an initialization procedure. Alternatively, the method 1500 may include performing the operations at block 1510, block 1515, block 1520, and/or block 1525. At block 1510, the method 1500 may include computing a fraction of time that the base station, UE, or apparatus performing the method 1500 transmits over a predetermined number of channels (e.g., half of the plurality of channels) of an unlicensed radio frequency spectrum band in parallel within an evaluation period. The unlicensed radio frequency spectrum band may include a radio frequency spectrum band for which transmitting apparatuses contend for access (e.g., a radio frequency spectrum band that is available for Wi-Fi use, or a radio frequency spectrum band that is available for use by multiple operators in an equally shared or prioritized manner). At block 1515, the method 1500 may include determining whether the fraction of time satisfies a threshold. When the fraction of time satisfies the threshold, the method 1500 may continue at block 1520, where the resynchronization flag may be set. When the fraction of time does not satisfy the threshold, the method 1500 may continue at block 1525, where the resynchronization flag may be cleared. The operations at block 1505, block 1510, block 1515, block 1520, or block 1525 may be performed using the wireless communication manager 720 or 820, the base station wireless communication manager 1060, or the UE wireless communication manager 1150 described with reference to FIG. 7, 8, 10, or 11, or the channel contention component 735 or 835 or resynchronization flag manager 870 described with reference to FIG. 8.

At block 1530, the method 1500 may include identifying a plurality of counters used to contend for access to a plurality of channels of the unlicensed radio frequency spectrum band. Each of the plurality of counters may be associated with a respective channel of the plurality of channels. The operation(s) at block 1530 may be performed using the wireless communication manager 720 or 820, the base station wireless communication manager 1060, or the UE wireless communication manager 1150 described with reference to FIG. 7, 8, 10, or 11, or the channel contention component 735 or 835 or counter manager 740 or 840 described with reference to FIG. 7 or 8.

At block 1535, the method 1500 may optionally include initiating a contention for access to at least a first channel and a second channel of the plurality of channels. A first counter (of the plurality of counters) may be associated with contention for access to the first channel, and a second counter (of the plurality of counters) may be associated with contention for access to the second channel. In some examples, contending for access to a channel may include performing a plurality of CCA procedures included in an eCCA procedure configured for the channel, and decrementing a counter associated with the channel each time the channel is determined to be clear during a CCA procedure. Contention for access to the channel may be won upon the counter associated with the channel reaching a final count. The operation(s) at block 1535 may be performed using the wireless communication manager 720 or 820, the base station wireless communication manager 1060, or the UE wireless communication manager 1150 described with reference to FIG. 7, 8, 10, or 11, or the channel contention component 735 or 835 described with reference to FIG. 7 or 8.

At block 1540, the method 1500 may include determining whether the first counter reaches a first final count of the first counter before the second counter reaches a second final count of the second counter. When the first counter reaches the first final count before the second counter reaches the second final count, the method 1500 may continue at block 1545. When the first counter does not reach the first final count before the second counter reaches the second final count, the method 1500 may continue at block 1560.

At block 1545, the method 1500 may include determining whether the resynchronization flag is set. When the resynchronization flag is set, the method 1500 may continue at block 1550. When the resynchronization flag is not set, the method 1500 may continue at block 1555.

At block 1550, the method 1500 may include setting a first current value of the first counter to a second current value of the second counter, and deferring transmission on the first channel, upon reach the first final count of the first counter before reaching the second final count of the second counter. For example, if the first current value is zero and the second current value is two, the first current value may be set to two. After setting the first current value of the first counter to the second current value of the second counter, the contention for access to at least the first channel and the second channel may continue.

At block 1555, the method 1500 may include winning contention for access to, and accessing, the first channel but not the second channel.

At block 1560, the method 1500 may include continuing the contention for access to the first channel and the second channel. If the first counter reaches the first final count at the same time the second counter reaches the second final count, the method 1500 may include winning contention for access to, and accessing, the first channel and the second channel.

The operation(s) at block 1540, block 1545, block 1550, block 1555, or block 1560 may be performed using the wireless communication manager 720 or 820, the base station wireless communication manager 1060, or the UE wireless communication manager 1150 described with reference to FIG. 7, 8, 10, or 11, the channel contention component 735 or 835 or channel synchronizer/desynchronizer 750 or 850 described with reference to FIG. 7 or 8, or the counter resynchronizer 865 described with reference to FIG. 8.

Thus, the method 1500 may provide for wireless communication. It should be noted that the method 1500 is just one implementation and that the operations of the method 1500 may be rearranged or otherwise modified such that other implementations are possible.

Figure 16:
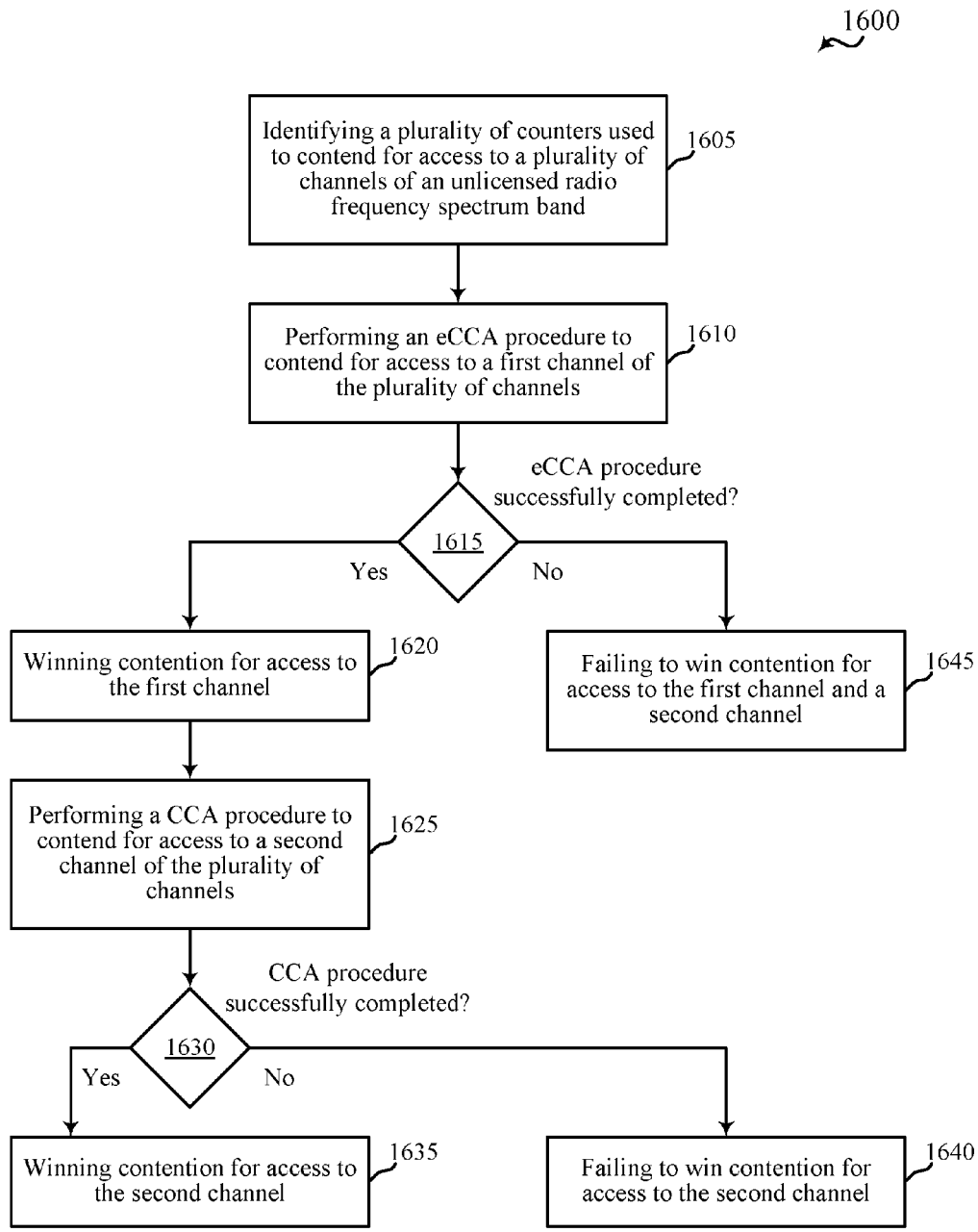
FIG. 16 is a flow chart illustrating an example of a method for wireless communication, in accordance with various aspects of the present disclosure.

FIG. 16 is a flow chart illustrating an example of a method 1600 for wireless communication, in accordance with various aspects of the present disclosure. For clarity, the method 1600 is described below with reference to aspects of one or more of the base stations 105 or 1005 described with reference to FIG. 1 or 10, aspects of one or more of the UEs 115 or 1115 described with reference to FIG. 1 or 11, or aspects of one or more of the apparatus 705 or the apparatus 905 described with reference to FIG. 7 or 9. In some examples, a base station, UE, or apparatus may execute one or more sets of codes to control the functional elements of the base station, UE, or apparatus to perform the functions described below. Additionally or alternatively, the base station, UE, or apparatus may perform one or more of the functions described below using special-purpose hardware.

At block 1605, the method 1600 may include identifying a plurality of counters used to contend for access to a plurality of channels of an unlicensed radio frequency spectrum band. Each of the plurality of counters may be associated with a respective channel of the plurality of channels of the unlicensed radio frequency spectrum band. The unlicensed radio frequency spectrum band may include a radio frequency spectrum band for which transmitting apparatuses contend for access (e.g., a radio frequency spectrum band that is available for Wi-Fi use, or a radio frequency spectrum band that is available for use by multiple operators in an equally shared or prioritized manner). The operation(s) at block 1605 may be performed using the wireless communication manager 720 or 920, the base station wireless communication manager 1060, or the UE wireless communication manager 1150 described with reference to FIG. 7, 9, 10, or 11, or the channel contention component 735 or 935 or counter manager 740 or 940 described with reference to FIG. 7 or 9.

At block 1610, the method 1600 may include performing an eCCA procedure to contend for access to a first channel of the plurality of channels. The eCCA procedure may be based at least in part on a first counter of the plurality of counters. In some examples, performing the eCCA procedure may include measuring an energy on the first channel during each of a plurality of CCA slots.

At block 1615, the method 1600 may include determining whether the eCCA procedure is successfully completed. Upon determining the eCCA procedure is successfully completed, the method 1600 may continue at block 1620. Upon determining the eCCA procedure is not successfully completed, the method 1600 may continue at block 1645.

At block 1620, the method 1600 may include winning contention for access to the first channel. The operations at block 1610, block 1615, or block 1620 may be performed using the wireless communication manager 720 or 920, the base station wireless communication manager 1060, or the UE wireless communication manager 1150 described with reference to FIG. 7, 9, 10, or 11, the channel contention component 735 or 935 or counter manager 740 or 940 described with reference to FIG. 7 or 9, or the eCCA manager 955 described with reference to FIG. 9.

At block 1625, the method 1600 may include performing a CCA procedure to contend for access to a second channel of the plurality of channels. The CCA procedure may be based at least in part on a second counter of the plurality of counters. In some examples, performing the CCA procedure may include measuring an energy on the second channel during a single CCA slot.

At block 1630, the method 1600 may include determining whether the CCA procedure is successfully completed. Upon determining the CCA procedure is successfully completed, the method 1600 may continue at block 1635. Upon determining the CCA procedure is not successfully completed, the method 1600 may continue at block 1640.

At block 1635, the method 1600 may include winning contention for access to the second channel upon successfully performing the eCCA procedure and the CCA procedure. At block 1640, the method 1600 may include failing to win contention for access to the second channel. The operations at block 1635 or block 1640 may be performed using the wireless communication manager 720 or 920, the base station wireless communication manager 1060, or the UE wireless communication manager 1150 described with reference to FIG. 7, 9, 10, or 11, the channel contention component 735 or 935 described with reference to FIG. 7 or 9, or the CCA manager 960 described with reference to FIG. 9.

At block 1645, the method 1600 may include failing to win contention for access to the first channel, and failing to win contention for access to the second channel based at least in part on failing to win contention for access to the first channel. The operation(s) at block 1645 may be performed using the wireless communication manager 720 or 920, the base station wireless communication manager 1060, or the UE wireless communication manager 1150 described with reference to FIG. 7, 9, 10, or 11, or the channel contention component 735 or 935 described with reference to FIG. 7 or 9.

Thus, the method 1600 may provide for wireless communication. It should be noted that the method 1600 is just one implementation and that the operations of the method 1600 may be rearranged or otherwise modified such that other implementations are possible.

In some examples, operation(s) of the method 1200, the method 1300, the method 1400, the method 1500, and/or the method 1600, described with reference to FIGS. 12, 13, 14, 15, and/or 16, may be combined.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Components implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method for wireless communication at a device, comprising:
    identifying a plurality of counters used to contend for access to a plurality of channels of an unlicensed radio frequency spectrum band, each of the plurality of counters associated with a respective channel of the plurality of channels of the unlicensed radio frequency spectrum band;

performing an extended clear channel assessment (eCCA) procedure to contend for access to a first channel of the plurality of channels, the eCCA procedure based at least in part on a counter of the plurality of counters;

measuring the first channel of the plurality of channels of the unlicensed radio frequency spectrum band, the measuring associated with the contention for access to the first channel of the plurality of channels of the unlicensed radio frequency spectrum band; and synchronizing or desynchronizing at least a subset of the plurality of counters based at least in part on the measuring.

2. The method of claim 1, wherein the synchronizing or desynchronizing comprises:
desynchronizing at least a first counter associated with contention for access to a first channel and a second counter associated with contention for access to a second channel when the measuring indicates a channel energy above an energy threshold on at least one of the first channel and the second channel.

3. The method of claim 1, further comprising:
performing the measuring during a time interval;
wherein the synchronizing or desynchronizing comprises splitting the plurality of counters into a first group of counters and a second group of counters when the measuring during the time interval indicates a channel energy above an energy threshold on each of the plurality of channels.

4. The method of claim 3, wherein the time interval comprises a CCA slot.

5. The method of claim 1, further comprising:
performing the measuring during a time interval;
wherein the synchronizing or desynchronizing comprises synchronizing at least a first counter associated with contention for access to a first channel and a second counter associated with contention for access to a second channel when the measuring during the time interval indicates a channel energy below an energy threshold on each of the first channel and the second channel.

6. The method of claim 5, wherein the time interval comprises a resynchronization slot belonging to a set of periodic resynchronization slots.

7. The method of claim 5, wherein the synchronizing comprises:
synchronizing the first counter and the second counter to a maximum of a first current value of the first counter and a second current value of the second counter.

8. The method of claim 1, wherein the plurality of counters comprises a first counter associated with contention for access to a first channel and a second counter associated with contention for access to a second channel, wherein the synchronizing or desynchronizing comprises:
setting a first current value of the first counter to a second current value of the second counter, and deferring transmission on the first channel, upon reaching a first final count of the first counter before reaching a second final count of the second counter and determining a resynchronization flag is set.

9. The method of claim 8, further comprising:
setting the resynchronization flag during an initialization procedure.

10. The method of claim 8, further comprising:
computing a fraction of time that the device transmits over a predetermined number of channels of the unlicensed radio frequency spectrum band in parallel within an evaluation period; and
setting the resynchronization flag based at least in part on the fraction of time satisfying a threshold.

11. The method of claim 1, wherein the synchronizing or desynchronizing comprises:
performing a clear channel assessment (CCA) procedure, upon winning contention for access to the first channel, to contend for access to a second channel of the plurality of channels; and
winning contention for access to the second channel upon successfully performing the eCCA procedure and the CCA procedure.

12. An apparatus for wireless communication at a device, comprising:
means for identifying a plurality of counters used to contend for access to a plurality of channels of an unlicensed radio frequency spectrum band, each of the plurality of counters associated with a respective channel of the plurality of channels of the unlicensed radio frequency spectrum band;
means for performing an extended clear channel assessment (eCCA) procedure to contend for access to a first channel of the plurality of channels, the eCCA procedure based at least in part on a counter of the plurality of counters;
means for measuring at least one channel of the plurality of channels of the unlicensed radio frequency spectrum band, the measuring associated with the contention for access to the first channel of the plurality of channels of the unlicensed radio frequency spectrum band; and
means for synchronizing or desynchronizing at least a subset of the plurality of counters based at least in part on the measuring.

13. The apparatus of claim 12, wherein the means for synchronizing or desynchronizing comprises:
means for desynchronizing at least a first counter associated with contention for access to a first channel and a second counter associated with contention for access to a second channel when the measuring indicates a channel energy above an energy threshold on at least one of the first channel and the second channel.

14. The apparatus of claim 12, further comprising:
means for performing the measuring during a time interval;
wherein the means for synchronizing or desynchronizing comprises means for splitting the plurality of counters into a first group of counters and a second group of counters when the measuring during the time interval indicates a channel energy above an energy threshold on each of the plurality of channels.

15. The apparatus of claim 12, further comprising:
means for performing the measuring during a time interval;
wherein the means for synchronizing or desynchronizing comprises means for synchronizing at least a first counter associated with contention for access to a first channel and a second counter associated with contention for access to a second channel when the measuring during the time interval indicates a channel energy below an energy threshold on each of the first channel and the second channel.

16. The apparatus of claim 15, wherein the time interval comprises a resynchronization slot belonging to a set of periodic resynchronization slots.

17. The apparatus of claim 15, wherein the means for synchronizing comprises:
means for synchronizing the first counter and the second counter to a maximum of a first current value of the first counter and a second current value of the second counter.

18. The apparatus of claim 12, wherein the plurality of counters comprises a first counter associated with contention for access to a first channel and a second counter associated with contention for access to a second channel, wherein the means for synchronizing or desynchronizing comprises:
means for setting a first current value of the first counter to a second current value of the second counter, and deferring transmission on the first channel, upon reaching a first final count of the first counter before reaching a second final count of the second counter and determining a resynchronization flag is set.

19. The apparatus of claim 18, further comprising:
means for computing a fraction of time that the device transmits over a predetermined number of channels of the unlicensed radio frequency spectrum band in parallel within an evaluation period; and
means for setting the resynchronization flag based at least in part on the fraction of time satisfying a threshold.

20. The apparatus of claim 12, wherein the means for synchronizing or desynchronizing comprises:
means for performing a clear channel assessment (CCA) procedure, upon winning contention for access to the first channel, to contend for access to a second channel of the plurality of channels; and
means for winning contention for access to the second channel upon successfully performing the eCCA procedure and the CCA procedure.

21. An apparatus for wireless communication at a device, comprising:
a processor;
a memory in electronic communication with the processor; and
the processor and the memory configured to:
identify a plurality of counters used to contend for access to a plurality of channels of an unlicensed radio frequency spectrum band, each of the plurality of counters associated with a respective channel of the plurality of channels of the unlicensed radio frequency spectrum band;
perform an extended clear channel assessment (eCCA) procedure to contend for access to a first channel of the plurality of channels, the eCCA procedure based at least in part on a counter of the plurality of counters;
measure at least one channel of the plurality of channels of the unlicensed radio frequency spectrum band, the measuring associated with the contention for access to the first channel of the plurality of channels of the unlicensed radio frequency spectrum band; and
synchronize or desynchronize at least a subset of the plurality of counters based at least in part on the measuring.

22. The apparatus of claim 21, wherein the synchronizing or desynchronizing comprises:
desynchronizing at least a first counter associated with contention for access to a first channel and a second counter associated with contention for access to a second channel when the measuring indicates a channel energy above an energy threshold on at least one of the first channel and the second channel.

23. The apparatus of claim 21, wherein the processor and the memory are configured to:
perform the measuring during a time interval;
wherein the synchronizing or desynchronizing comprises splitting the plurality of counters into a first group of counters and a second group of counters when the measuring during the time interval indicates a channel energy above an energy threshold on each of the plurality of channels.

24. The apparatus of claim 21, wherein the processor and the memory are configured to:
perform the measuring during a time interval;
wherein the synchronizing or desynchronizing comprises synchronizing at least a first counter associated with contention for access to a first channel and a second counter associated with contention for access to a second channel when the measuring during the time interval indicates a channel energy below an energy threshold on each of the first channel and the second channel.

25. The apparatus of claim 21, wherein the plurality of counters comprises a first counter associated with contention for access to a first channel and a second counter associated with contention for access to a second channel, wherein the synchronizing or desynchronizing comprises:
setting a first current value of the first counter to a second current value of the second counter, and deferring transmission on the first channel, upon reaching a first final count of the first counter before reaching a second final count of the second counter and determining a resynchronization flag is set.

26. The apparatus of claim 25, wherein the processor and the memory are configured to:
set the resynchronization flag during an initialization procedure.

27. The apparatus of claim 25, wherein the processor and the memory are configured to:
compute a fraction of time that the device transmits over a predetermined number of channels of the unlicensed radio frequency spectrum band in parallel within an evaluation period; and
set the resynchronization flag based at least in part on the fraction of time satisfying a threshold.

28. A non-transitory computer-readable medium storing computer-executable code for wireless communication, the code executable by a processor to:
identify a plurality of counters used to contend for access to a plurality of channels of an unlicensed radio frequency spectrum band, each of the plurality of counters associated with a respective channel of the plurality of channels of the unlicensed radio frequency spectrum band;
perform extended clear channel assessment (eCCA) procedure to contend for access to a first channel of the plurality of channels, the eCCA procedure based at least in part on a counter of the plurality of counters;
measure at least one channel of the plurality of channels of the unlicensed radio frequency spectrum band, the measuring associated with the contention for access to the first channel of the plurality of channels of the unlicensed radio frequency spectrum band; and
synchronize or desynchronize at least a subset of the plurality of counters based at least in part on the measuring.

* * * * *